United States Patent
Johnson

(10) Patent No.: US 11,152,644 B2
(45) Date of Patent: Oct. 19, 2021

(54) REINFORCED BATTERY PACKAGE WITH SEALED ANODE CHAMBER

(71) Applicant: Johnson IP Holding, LLC, Atlanta, GA (US)

(72) Inventor: Lonnie G. Johnson, Atlanta, GA (US)

(73) Assignee: JOHNSON IP HOLDING, LLC, Atlanta, GA (US)

( * ) Notice: Subject to any disclaimer, the term of this patent is extended or adjusted under 35 U.S.C. 154(b) by 128 days.

(21) Appl. No.: 15/558,763

(22) PCT Filed: Mar. 18, 2016

(86) PCT No.: PCT/US2016/023117
§ 371 (c)(1),
(2) Date: Sep. 15, 2017

(87) PCT Pub. No.: WO2016/153992
PCT Pub. Date: Sep. 29, 2016

(65) Prior Publication Data
US 2018/0083318 A1 Mar. 22, 2018

Related U.S. Application Data

(60) Provisional application No. 62/137,991, filed on Mar. 25, 2015.

(51) Int. Cl.
*H01M 10/0585* (2010.01)
*H01M 50/543* (2021.01)
(Continued)

(52) U.S. Cl.
CPC ......... *H01M 10/0585* (2013.01); *H01M 4/13* (2013.01); *H01M 4/667* (2013.01);
(Continued)

(58) Field of Classification Search
CPC ...... H01M 10/0562; H01M 2/02; H01M 2/10; H01M 10/0486; H01M 10/0585; H01M 50/543
See application file for complete search history.

(56) References Cited

U.S. PATENT DOCUMENTS 3,928,077 A 12/1975 Sperandio et al.
2006/0216589 A1 9/2006 Krasnov et al.
(Continued)

FOREIGN PATENT DOCUMENTS

JP 2000123801 A 4/2000
JP 2000223085 A 8/2000
(Continued)

OTHER PUBLICATIONS

Office Action dated Mar. 4, 2019 in JP Application No. 2017549732.
Office Action dated Nov. 19, 2018 in JP Application No. 2017549732.
(Continued)

*Primary Examiner* — James Lee
(74) *Attorney, Agent, or Firm* — Panitch Schwarze Belisario Nadel LLP

(57) ABSTRACT

A solid state battery cell has a frame formed by a non-electrically conductive material. The frame has a frame thickness (Tf). A cell core surrounded by and entirely within the frame has a cell-core thickness (Tc). The cell core includes at least one anode, at least one cathode and at least one electrolyte between the at least one anode and the at least one cathode. At least one cell-core swell-accommodating recess is surrounded by and entirely within the frame. The at least one cell-core swell-accommodating recess defines an internal cell volume into which the cell core is expandable and from which the cell core is contractible. The
(Continued)

cell-core thickness (Tc) is less than or equal to the frame thickness (Tf) during cell-charge and/or cell-discharge cycling.

21 Claims, 20 Drawing Sheets

(51) Int. Cl.
  *H01M 10/0562* (2010.01)
  *H01M 10/04* (2006.01)
  *H01M 4/70* (2006.01)
  *H01M 10/052* (2010.01)
  *H01M 6/46* (2006.01)
  *H01M 4/66* (2006.01)
  *H01M 4/13* (2010.01)
  *H01M 6/40* (2006.01)

(52) U.S. Cl.
  CPC ............... *H01M 4/70* (2013.01); *H01M 6/46* (2013.01); *H01M 10/0486* (2013.01); *H01M 10/052* (2013.01); *H01M 10/0562* (2013.01); *H01M 50/543* (2021.01); *H01M 6/40* (2013.01)

(56) References Cited

U.S. PATENT DOCUMENTS

2007/0020509 A1  1/2007  Kim
2014/0265915 A1* 9/2014  Huang ................ H01M 2/1094
                                              315/291

FOREIGN PATENT DOCUMENTS

| JP | 2004193006 A | 7/2004 |
| JP | 2005196991 A | 7/2005 |
| JP | 2007242262 A | 9/2007 |
| JP | 2008130371 A | 6/2008 |
| KR | 20060011242 A | 2/2006 |

OTHER PUBLICATIONS

Int'l Search Report and Written Opinion dated Jun. 6, 2016 in Int'l Application No. PCT/US2016/023117.
Office Action dated Sep. 6, 2018 in EP Application No. 16712672.1.
Office Action dated Mar. 19, 2020 in CN Application No. 20168001834461.
Office Action dated Sep. 14, 2020 in CN Application No. 201680018346.1.

* cited by examiner

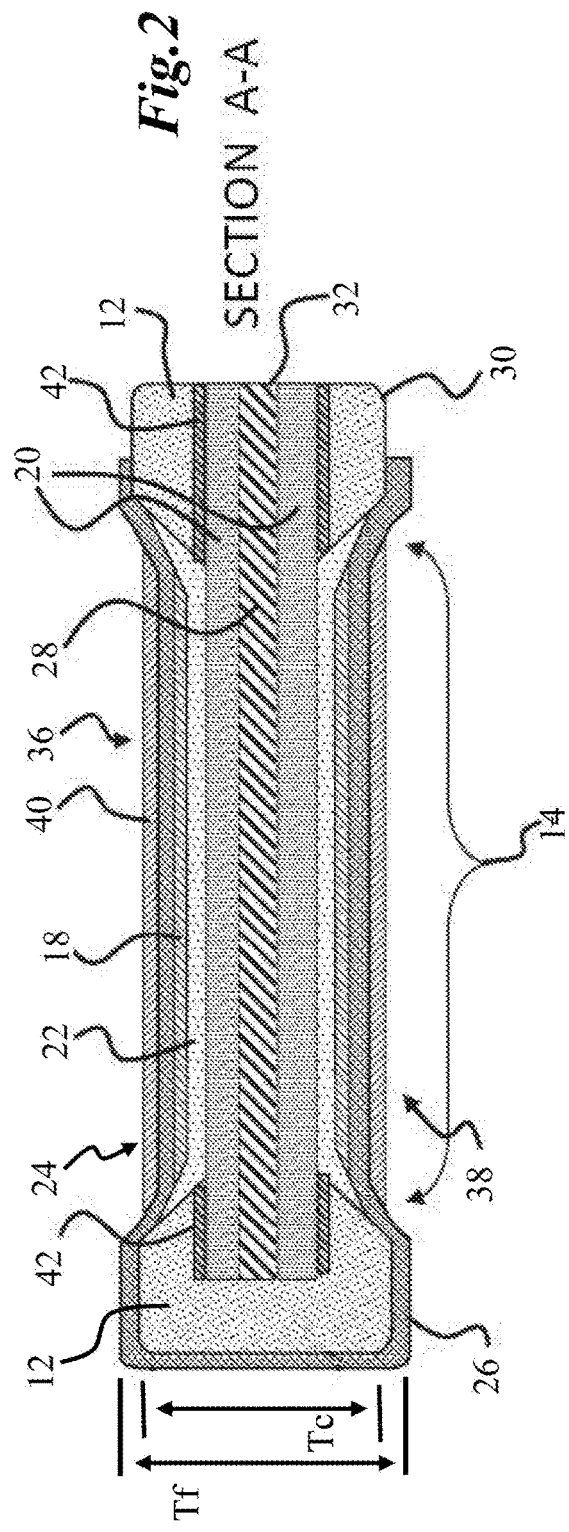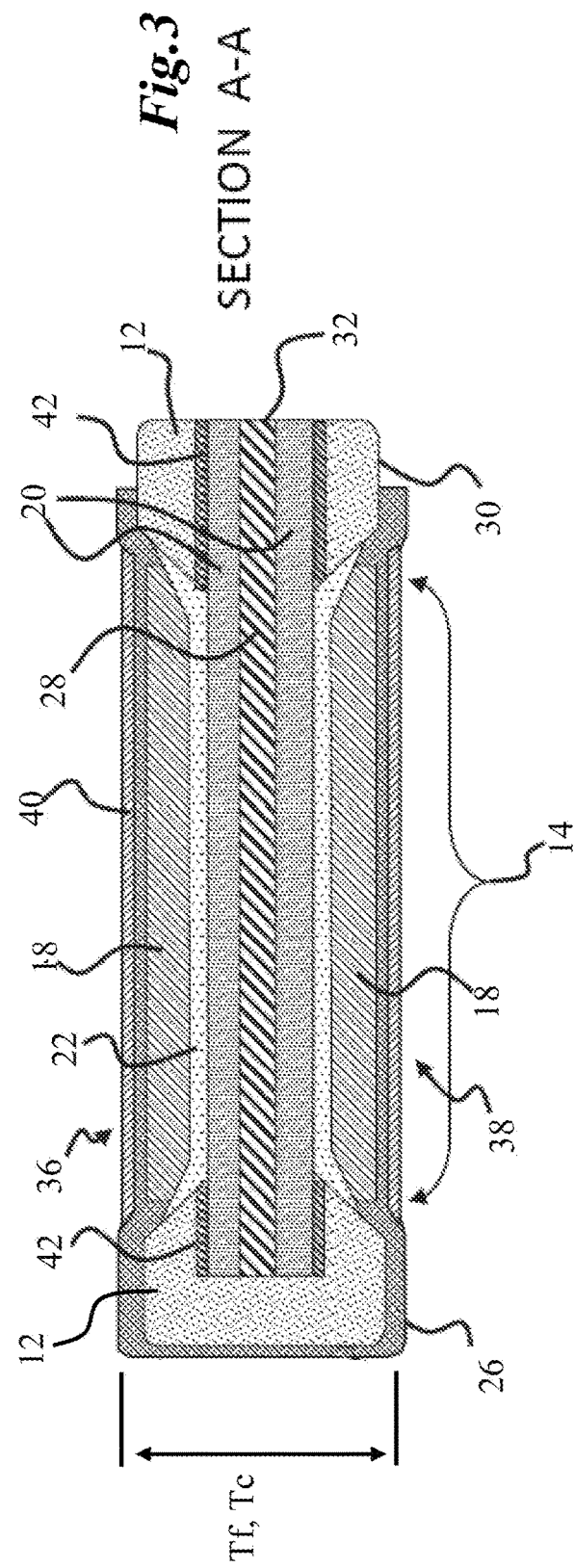

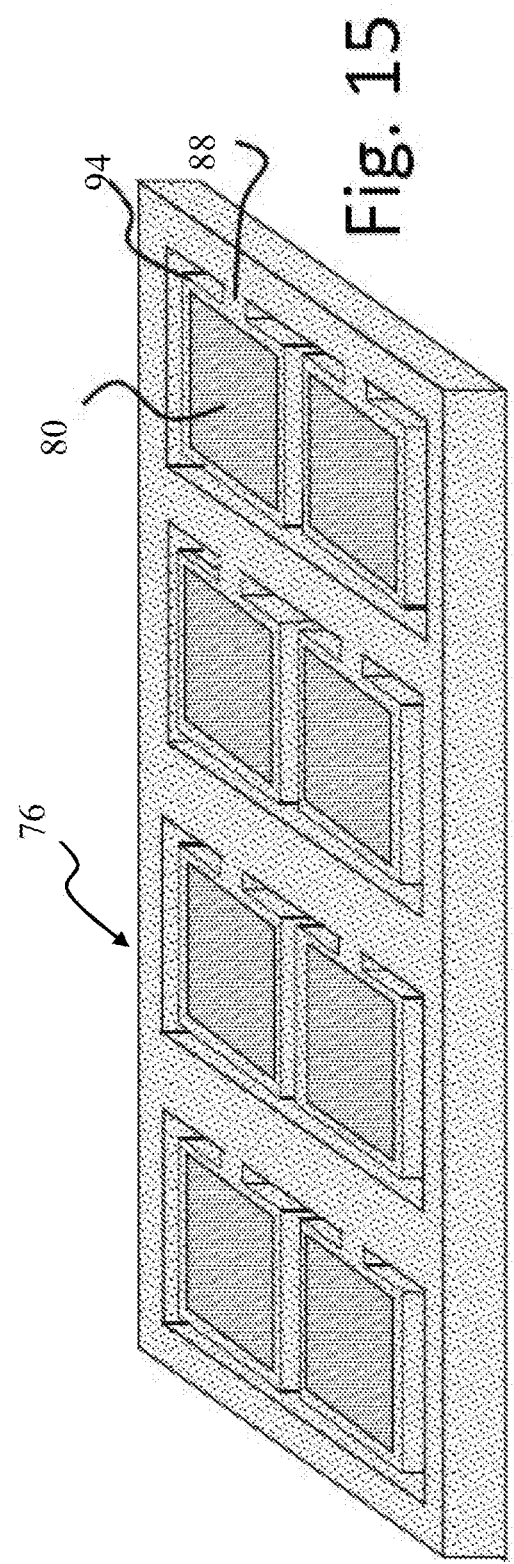
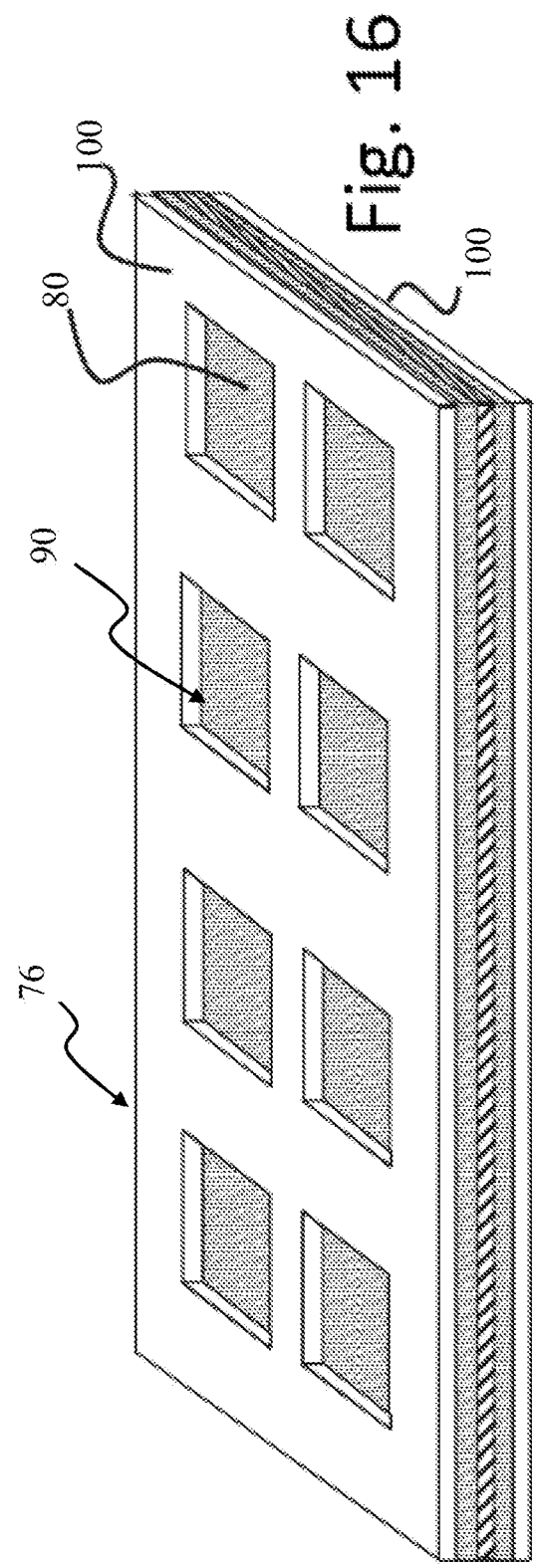

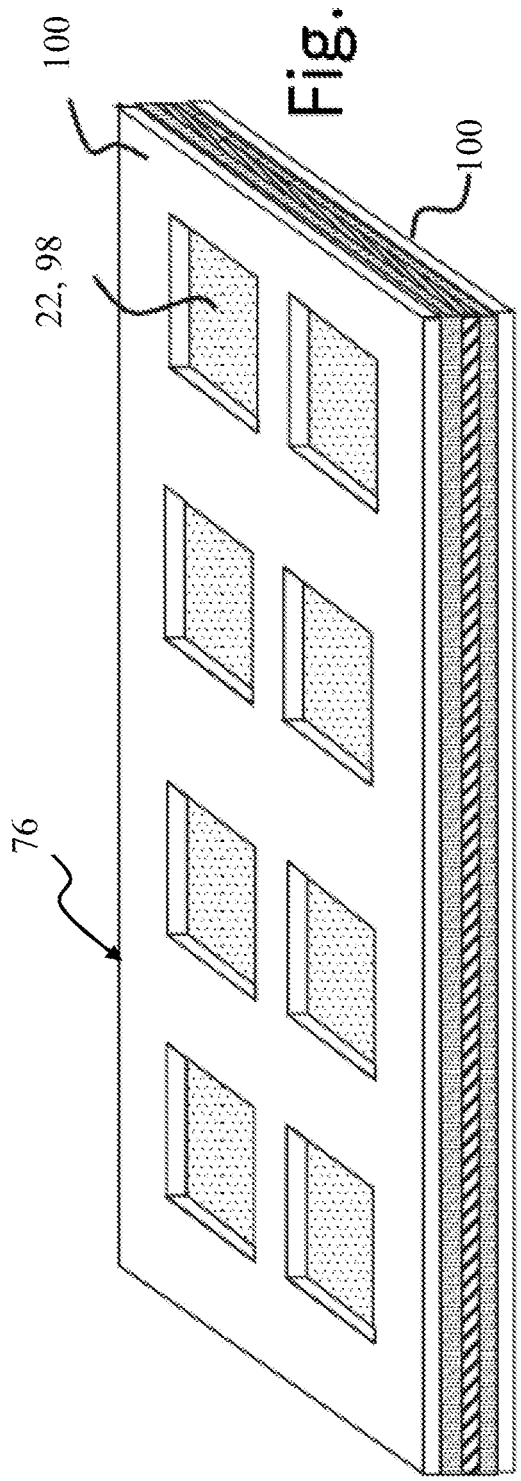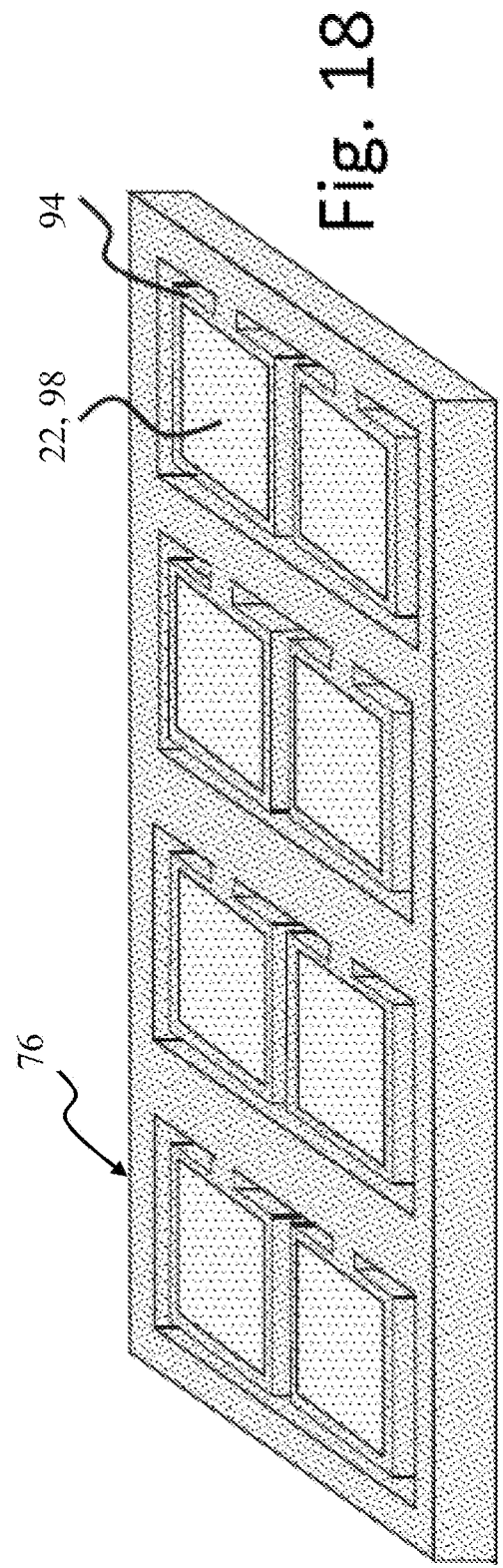

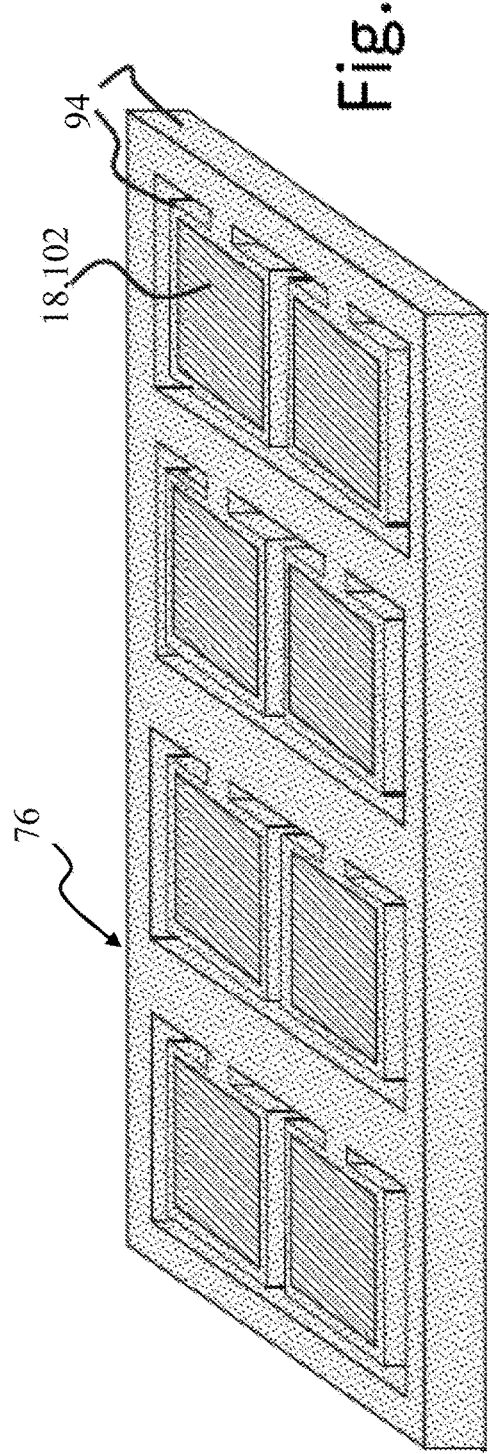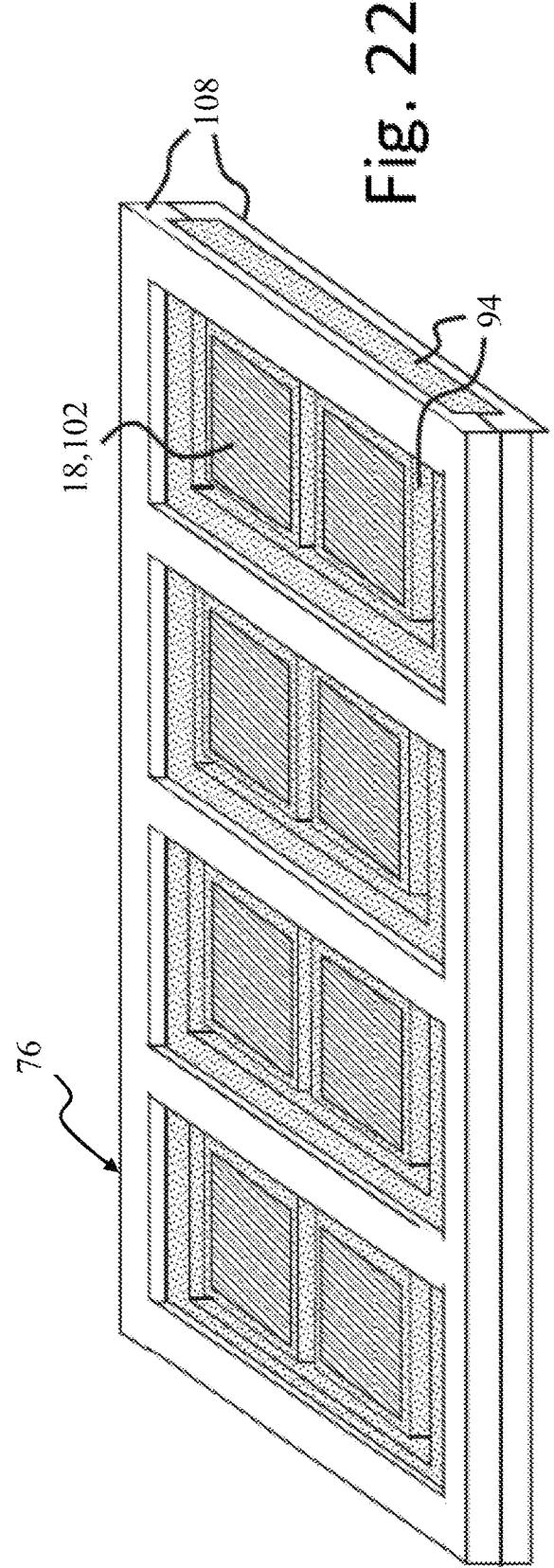

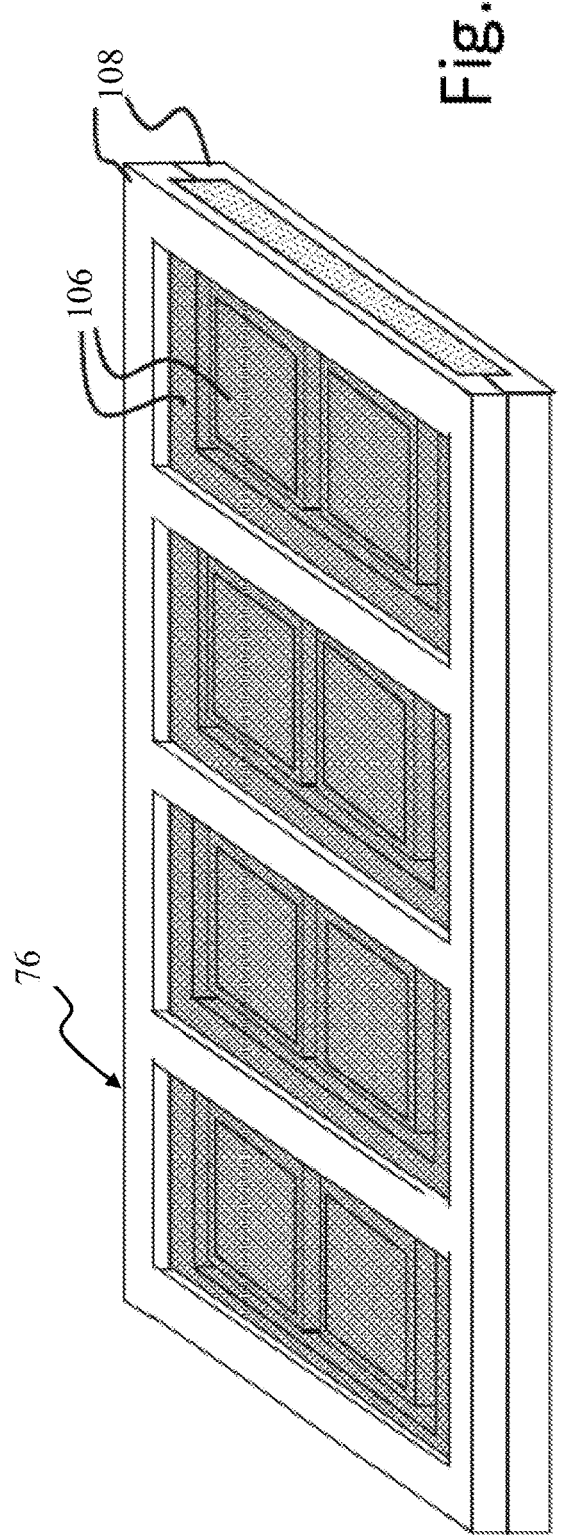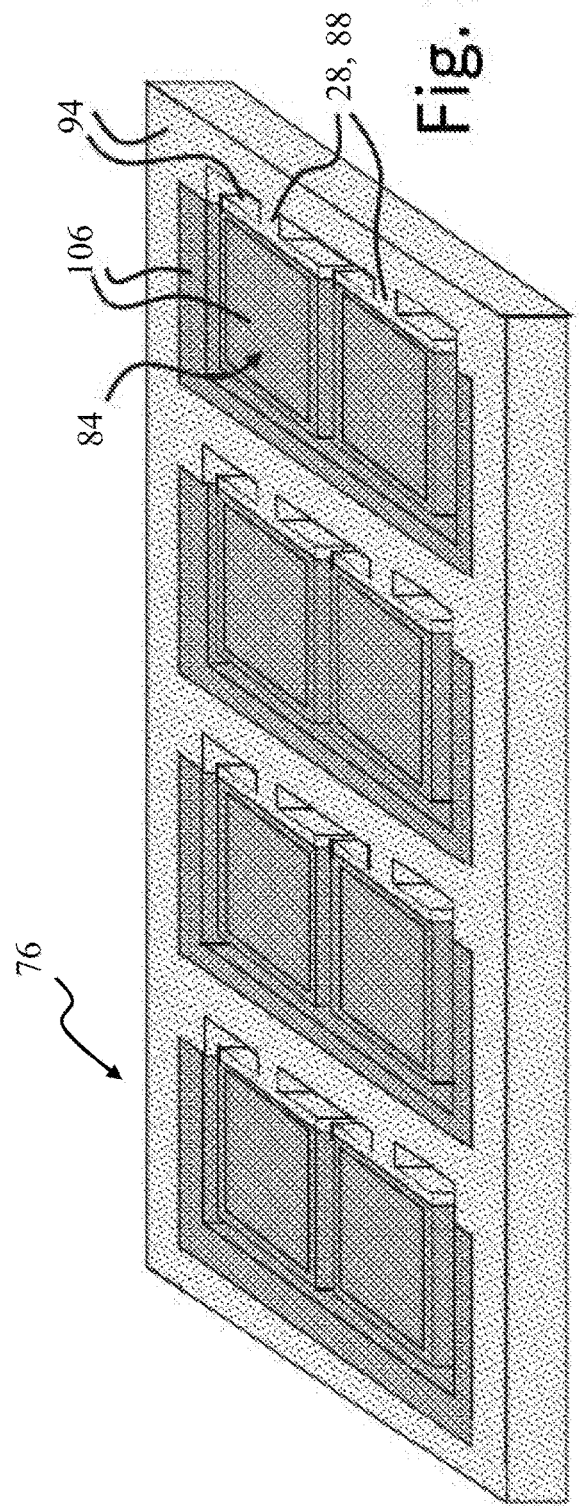

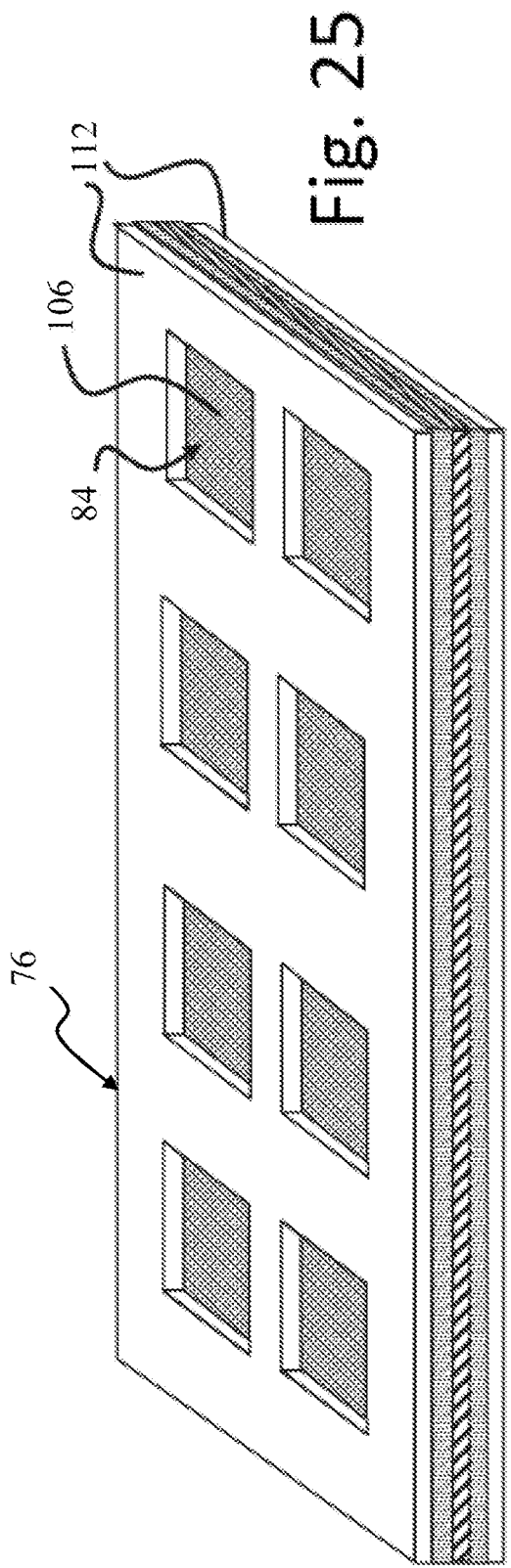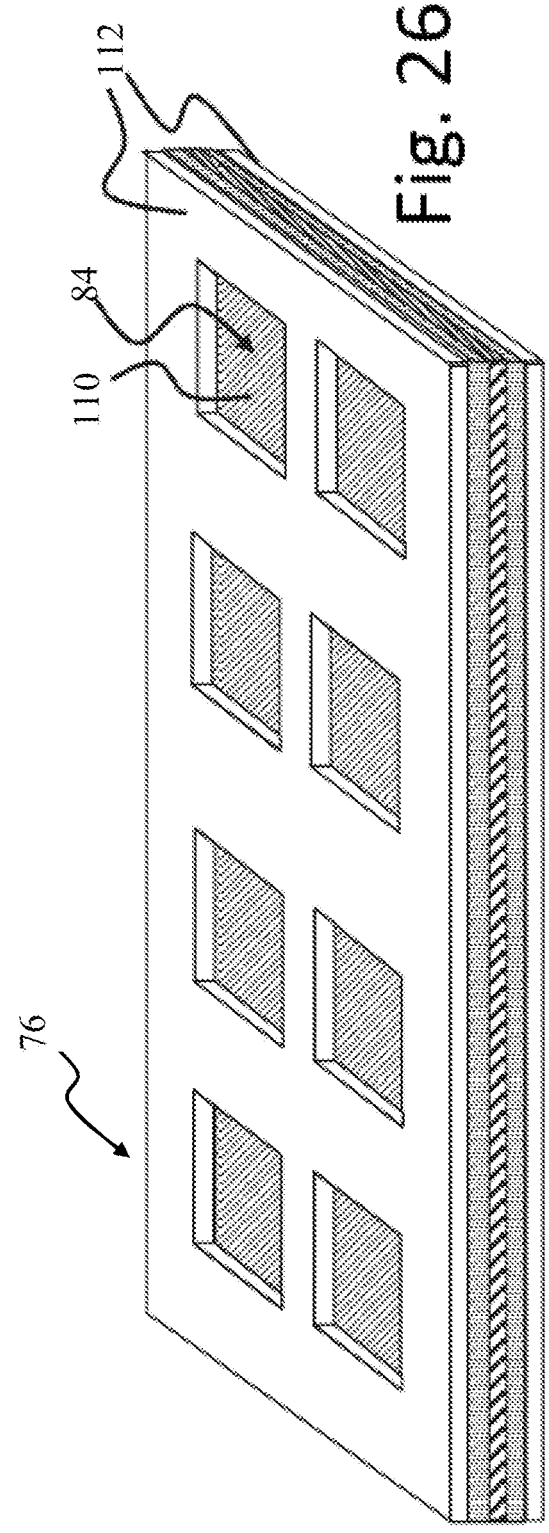

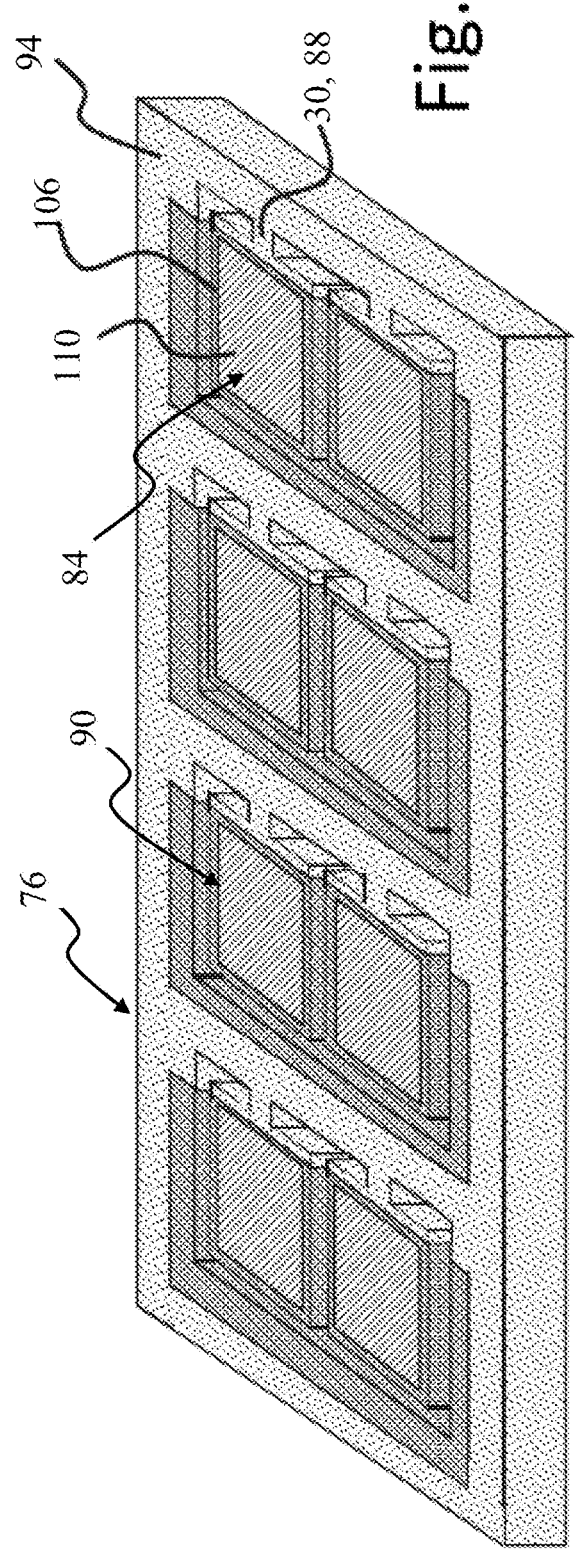

SECTION B-B

REINFORCED BATTERY PACKAGE WITH SEALED ANODE CHAMBER

CROSS-REFERENCE TO RELATED APPLICATION

This application is a Section 371 (National Phase) of International Application No. PCT/US2016/023117, filed Mar. 18, 2016, which was published in the English language on Sep. 29, 2016 under International Publication No. WO/2016/153992 A1, and which claims priority to U.S. Provisional Patent Application No. 62/137,991, filed Mar. 25, 2015, the disclosures of which are incorporated by reference herein in their entireties.

BACKGROUND OF THE INVENTION

(1) Field of the Invention

The present invention relates to battery packages for electrochemical cells. More particularly, the present invention relates to a battery package having an anode chamber for containing lithium-based anodes and accommodating the change in anode volume which occurs with certain anode formulations.

(2) Description of Related Art

This invention addresses packaging for solid-state lithium batteries. Early solid state lithium batteries that were developed by Duracell® in the 1970s and made commercially available in the 1980s, are no longer produced. Those cells included a lithium metal anode, a dispersed phase electrolyte of lithium iodide and Al2O3, and a metal salt as the cathode. The Li/LiI(Al2O3)/metal salt construction was a true solid-state battery, but the batteries were not rechargeable.

Currently, Li-ion battery chemistry that employ liquid electrolyte provides the best known performance and has become the most widely used of all battery chemistries. Lithium ion cells consist of thick (~100 μm) porous composite cathodes cast on a thin (~10 μm) Al foil current collector. The composite cathode typically contains both lithium cobalt oxide LiCoO2 as the active material, due to its high capacity and good cycle life, and carbon black, which provides electrical conductivity throughout the layer. A thin polymer separator provides electrical isolation between the cathode and the carbon-based anode, which intercalates Li during the charge cycle. The cell is soaked in a liquid electrolyte, which provides very high conductivity for the transport of Li ions between the cathode and anode during charge and discharge. Because the thick composite cathode is porous, the liquid electrolyte is absorbed into and fills the structure, thus providing excellent surface contact with the LiCoO2 active material and allowing fast transport of Li ions throughout the cell with minimal impedance.

The liquid electrolyte itself consists of a Li salt (for example, lithium hexaflourophosphate, LiPF6) in a solvent blend which typically includes ethylene carbonate and other linear carbonates, such as dimethyl carbonate. Despite improvements in energy density and cycle life, there remain several underlying problems with batteries that contain liquid electrolytes. For example, liquid electrolytes are generally volatile and subject to pressure build up, explosion and fire under a high charge rate, a high discharge rate, and/or internal short circuit conditions. Additionally, charging at a high rate can cause dendritic lithium growth on the surface of the anode. The resulting dendrites can extend through the separator and cause a short circuit in the cell. Further, the self-discharge and efficiency of the cell is limited by side reactions and corrosion of the cathode by the liquid electrolyte. Finally, the liquid electrolyte also creates a hazard if the cell over-heats due to overvoltage or short circuit conditions, creating another potential fire or explosion hazard.

Because of the passivation reactions and unstable interfaces that form between organic electrolyte materials such as liquid and solid polymer electrolytes, it has long been a goal to develop a rechargeable solid state lithium-based battery using an inorganic solid electrolyte material. In the early 1990s, a second type of all-solid-state battery was developed at the Oak Ridge National Laboratories, 1 Bethel Valley Rd, Oak Ridge, Tenn. 37831. These cells consisted of thin films of cathode, inorganic electrolyte, and anode materials deposited on a ceramic substrate using vacuum deposition techniques, including RF sputtering for the cathode and electrolyte and vacuum evaporation of the Li metal anode. The total thicknesses of the cells were typically less than 10 μm: the cathode had a thickness of less than 4 μm, the solid electrolyte a thickness of around 2 μm (just sufficient to provide electrical isolation of the cathode and anode) and the Li anode a thickness of around 2 μm. Since strong chemical bonding (both within each layer and between the layers of the cell) was provided by the physical vapor deposition technique, the transport properties of these cells were excellent. Although the solid electrolyte lithium phosphorous oxy-nitride LiPON has a conductivity of only $2\times10^{-6}$ S/cm−1 (fifty times lower than that of the LiI(Al2O3) solid electrolyte used in the earlier Duracell® battery), the impedance of the thin 2 μm layer was very small, allowing for very high rate capability. However, batteries based on this technology are very expensive to fabricate, are very small, and have very low capacity.

Solid-state batteries are the focus of a great deal of attention because of the potential for attractive performance properties including: (1) long shelf life, (2) long term stable power capability, (3) no gassing, (4) broad operating temperature range: 40° C. to 170° C. for pure lithium anodes and up to and beyond 300° C. using active composite anodes, and (5) high volumetric energy density, up to 2000 Wh/L. They are particularly suited for applications requiring long life under low-drain or open-circuit conditions.

Solid-state batteries are being developed that employ high capacity lithium intercalation compounds. These all-solid-state batteries consist of a composite cathode containing active battery cathode material (e.g., LiNiMnCoO2, LiCoO2, LiMn2O4, Li4Ti5O12 or similar), an electrically conductive material (e.g., carbon black), and lithium ion conductive glass electrolyte material, such as Li3xLa2/3-xTiO3 (x=0.11) (LLTO) or Li7La3Zr2O12 (LLZO) that may be formed in situ from a liquid precursor via a low temperature sol gel process. When gelled and subsequently cured, the precursor is transformed into a solid lithium ion conductive glass electrolyte. Past attempts at constructing such all-solid-state batteries have been limited by the need to bind the materials together in order to facilitate effective lithium ion transport across interfaces. This binding process has been attempted by sintering at high temperature, such as 600° C. and higher. However, the cathode and electrolyte materials may react with each other at such sintering temperatures, resulting in high impedance interfaces and an ineffective battery.

The all-solid-state primary cell developed by Duracell® and described above demonstrated very high energy densities of up to 1000 Wh/L and excellent performance in terms of safety, stability, and low self-discharge. However, due to the pressed powder construction and the requirement for a thick electrolyte separation layer, the cell impedance was very high, severely limiting the discharge rate of the battery. This type of cell is also restricted in application because the electrochemical window is limited to less than three volts due to the iodide ions in the electrolyte, which are oxidized above approximately three volts. In addition, a stable rechargeable version of this cell was never developed.

The all-solid-state thin film battery developed by Oak Ridge National Laboratories, also detailed above, addresses many of the problems associated with Li-ion technology, but also has limitations. The vacuum deposition equipment required to fabricate the cells is very expensive and the deposition rates are slow, leading to very high manufacturing costs. Also, in order to take advantage of the high energy density and power density afforded by use of the thin films, it is necessary to deposit the films on a substrate that is much smaller and lighter than the battery layers themselves so that the battery layers make up a significant portion of the volume and weight of the battery compared to the inert substrate and packaging components. Ideally, one would simply use thicker battery electrode layers and thereby make the substrate a less significant percentage of the battery's volume; however, the problem is that it is not practical to increase the electrode thickness beyond a few microns. Lithium diffuses through most electrode materials is relatively slow which makes the use of thick electrode layers impractical because the resulting battery could not be cycled at useful charge and discharge rates. Therefore the films must be deposited on very thin substrates (<50 μm) or multiple batteries must be built up on a single substrate in order to achieve appreciable energy density. Use of a single substrate with multiple cells is not practical because the construction process for thin film batteries includes a high temperature annealing process for the cathodes. The high temperature annealing step would have to occur each time a cathode layer is applied. The high temperature annealing step is not compatible with the electrolyte and anode layers which would already have been assembled in the stack as components in other cells.

It is important that the components of a cell be kept in optimum working condition in order for a cell to operate properly. Of particular concern is a cell anode that contains lithium. Lithium is very desirable as anode material because it is one of the lightest of elements and materials, is the lightest metal, is capable of producing a high voltage in an electrochemical reaction, has high electrochemical equivalence, and has good conductivity. Lithium metal has the highest standard potential and electrochemical equivalence of all metals. Furthermore, lithium as active anode material has high energy density and high specific energy. Batteries employing lithium anodes are capable of operating over a very wide temperature range while having a long shelf life. Thus it can be appreciated that it is desirable to have a cell/battery that employs lithium as active anode material.

A problem in using anodes that have lithium as active anode material is that lithium is highly reactive with some commonly found substances such as water, water vapor, oxygen, and nitrogen and air containing one or more of the previously-listed substances. Furthermore, the reactivity of lithium with various substances can cause lithium to be flammable under certain conditions relating to particle size, pressure, substances in the environment and ambient temperature. For example, lithium can react adversely with water such that it degrades to form substances that are not suitable cell/battery anode components. As another example, when exposed to moist air, lithium can tarnish or corrode. In addition, lithium can ignite and burn in oxygen when exposed to water or water vapors. A related problem is that lithium-based fires can be difficult to extinguish. Thus it can be seen that very common materials such as air and water can have very undesirable effects upon lithium that can cause a cell or battery employing lithium to not operate optimally or that can even present safety problems. In addition, a sufficiently high increase in ambient temperature can promote lithium combustion that then becomes a problem. Therefore, in general, lithium employed in a battery must be protected to the greatest extent possible from exposure to all but optimum conditions. Thus it can be appreciated that it would be useful to have a battery package that protects lithium anode material from exposure to injurious materials and conditions that commonly may be present in environments where batteries are employed.

Lithium and other high performance anode materials being investigated for use in advanced lithium cells can experience very large volume changes with charge/discharge cycling, silicon in particular can experience a change in volume as high as 300%. Since battery stacks often consist of a large number of cell stacked together, such large anode volume changes can have a dramatic mechanical and structural impact on the stack itself, the packaging used for the battery pack as well and the mechanical specifications of host equipment that houses the battery, particularly if the entire battery stack changes it volume as the cells are cycled.

Attempts to address this need have resulted in bulky packaging materials that have a significant impact on the overall energy density and specific energy of the packaged battery. Often improvements in energy density and specific energy related performance are negated by the need for effective packaging. Thus it can be understood that a packaging system that can provide long term reliable protection and yet not add significant volume or significant weight to a battery cell or pack would be of great benefit.

BRIEF SUMMARY OF THE INVENTION

According to one aspect of the present invention, a cell structure is provided that accommodates changes in volume of the lithium anodes within individual cells in a stack while eliminating any impacts that an anode volume change would have on other cells within the package. Each individual cell includes a packaging structure that forms an anode well or cavity into and from which lithium is plated and stripped as the cell is cycled. The well may include lithium metal as an anode or a lithium active material that undergoes substantially reversible reactions with the lithium as the cell is charged and discharged.

According to another aspect of the present invention, each individual cell has a planar configuration and is positioned within a frame like structure which extends around its perimeter. The frame defines an area of the cell that is not active. The frame covered region of the cell is protected from the electrochemical processes which occur in the center, active region, of the cell during cycling. The frame covered region remains chemically and mechanically stable. The frame like structure around the perimeter of the cell is thicker than the active, center region such that as the cell is cycled and the anode thickness changes within the active area of the cell, the overall thickness of the cell as defined by the frame does not change. Thus the cell can be stacked with the frames determining the stack thickness with each cell having an active region in the form of a well within which the lithium based anode can vary in thickness as the cells in the stack are cycled without affecting the overall thickness of the stack.

According to still another aspect of the present invention, a solid state battery cell comprises a frame formed by a non-electrically conductive material. The frame has a frame thickness. A cell core surrounded by and entirely within the frame has a cell-core thickness. The cell core comprises at least one anode, at least one cathode and at least one electrolyte between the at least one anode and the at least one cathode. At least one cell-core swell-accommodating recess is surrounded by and entirely within the frame. The at least one cell-core swell-accommodating recess defines an internal cell volume into which the cell core is expandable and from which the cell core is contractible. The cell-core thickness is less than or equal to the frame thickness during cell-charge and/or cell-discharge cycling.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, the drawings show embodiments which are presently preferred. It should be understood, however, that the invention is not limited to the precise arrangements and instrumentalities shown.

In the drawings:

FIG. 2 is a sectional view of the cell of FIG. 1 taken along cross section plane A-A of FIG. 1;

FIG. 3 is a sectional view of the cell of FIG. 1 but in a charged state where the volume of the lithium based anode has increased;

FIG. 15 is a top perspective view of the array of cells of FIG. 13 with the cathode masks removed to expose the surface of the individual cell cathodes;

FIG. 16 is a top perspective view of the cell array of FIG. 14 with an electrolyte mask in place in preparation for an electrolyte coating;

FIG. 17 is a top perspective view of the cell array of FIG. 16 wherein an electrolyte coating has been applied over the exposed active area of the individual cathodes;

FIG. 18 is a top perspective view of the cell array of FIG. 16 with the electrolyte mask removed showing a coating of electrolyte on the active surface areas of the cells;

FIG. 21 is a top perspective view of the cell array of FIG. 20 with the mask removed to provide a view of the coating of optional anode material in the active areas of the cells;

FIG. 22 is a top perspective view of the cell array of FIG. 20 having a current collector mask in place in preparation for a coating of electrically conductive material that will extend over the edges of the cells to connect the anodes on both sides of a given cell to each other;

FIG. 23 is a top perspective view showing the cell array of FIG. 22 wherein a coating of electrically conductive material has been applied covering the exposed surfaces of the cell array structure as defined by the current collector mask;

FIG. 24 is a top perspective view of the cell array of FIG. 23 showing the current collector mask removed to provide a view of the surface areas covered by the current collector material;

FIG. 25 is a top perspective view of the cell array of FIG. 24 having a mask in place in preparation for applying a coating of an pliable material such as a polymer coating onto the active areas of the cells;

FIG. 26 is a top perspective view of the cell array of FIG. 25 having a coating of an pliable material coating on the active areas of the cells;

FIG. 27 is a top perspective view of the cell array of FIG. 26 showing the pliable material mask removed to provide a view of the surface areas covered by the pliable material coating;

DETAILED DESCRIPTION OF THE INVENTION

Figure 1:
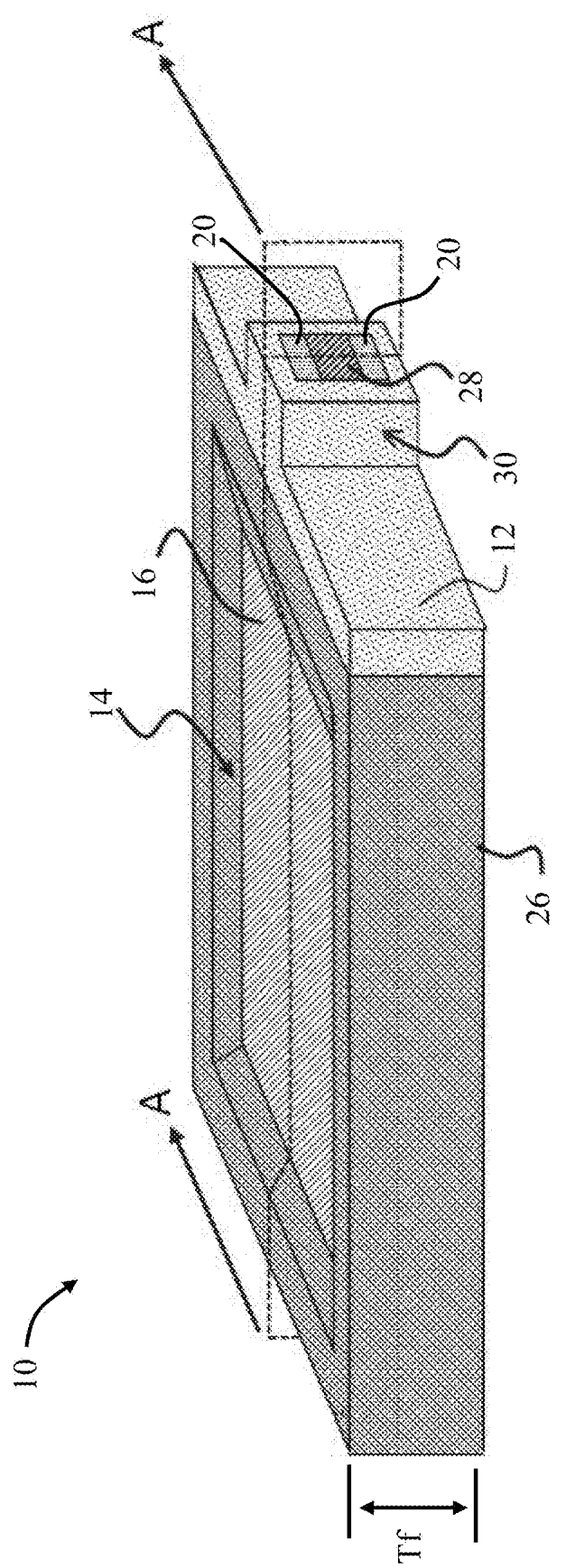
FIG. 1 is a top perspective view of an embodiment of a battery cell having packaging frame defining an inactive perimeter region and a maximum cell thickness in accordance with the teachings of the present invention.
Figure 4:
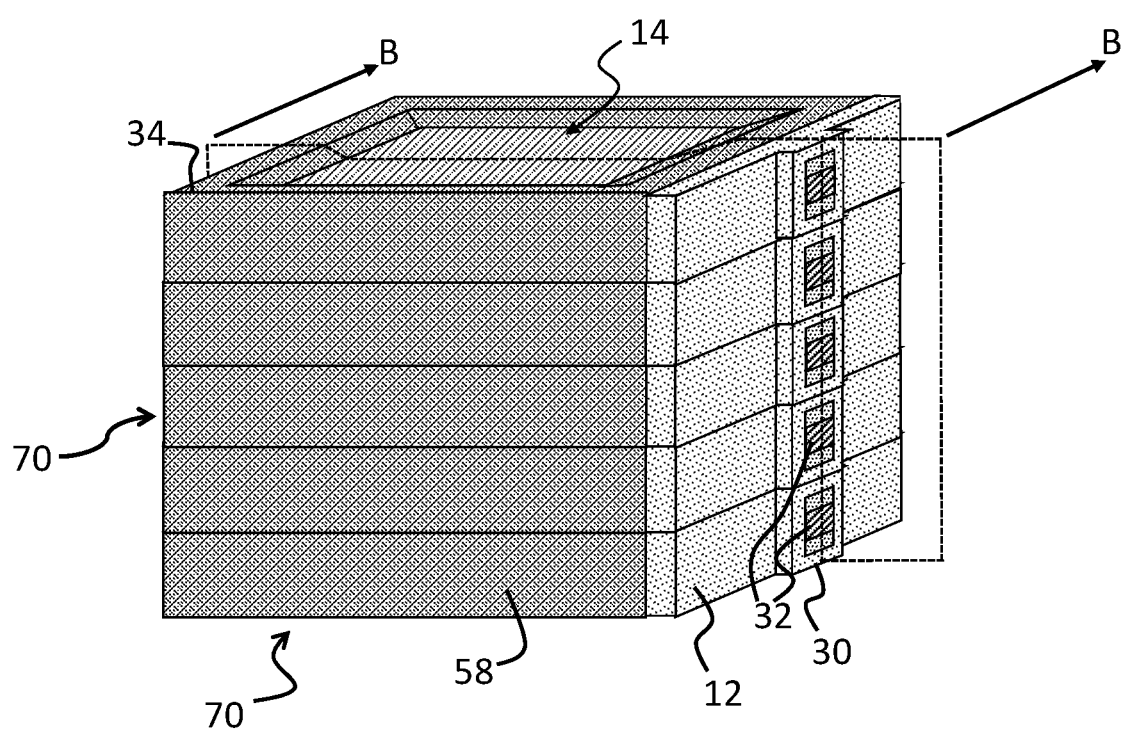
FIG. 4 is a top perspective view of an embodiment of a battery cell stack wherein the frames of the cells in the stack determine the overall stack height in accordance with the teachings of the present invention.
Figure 5:
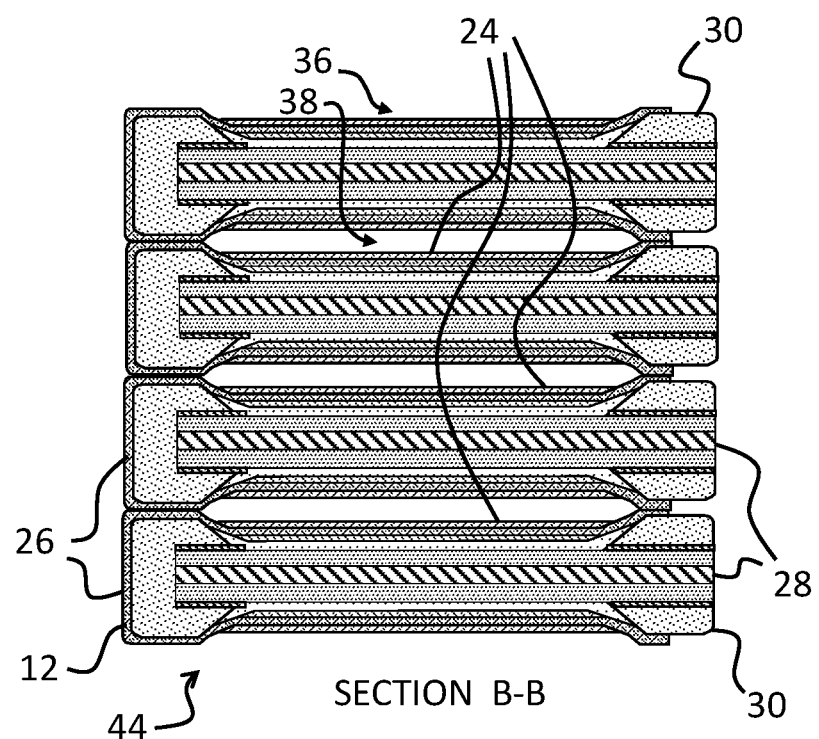
FIG. 5 is a sectional view of the cell stack of FIG. 4 taken along cross section plane B-B of FIG. 4 showing the packaging frames of the cells defining an inactive perimeter region separately from an active center region whereby expansion volume is available within the stack to accommodate changes in volume of the anodes of the cells with charge/discharge cycling without changing the overall stack height in accordance with the teachings of the present invention.
Figure 6:
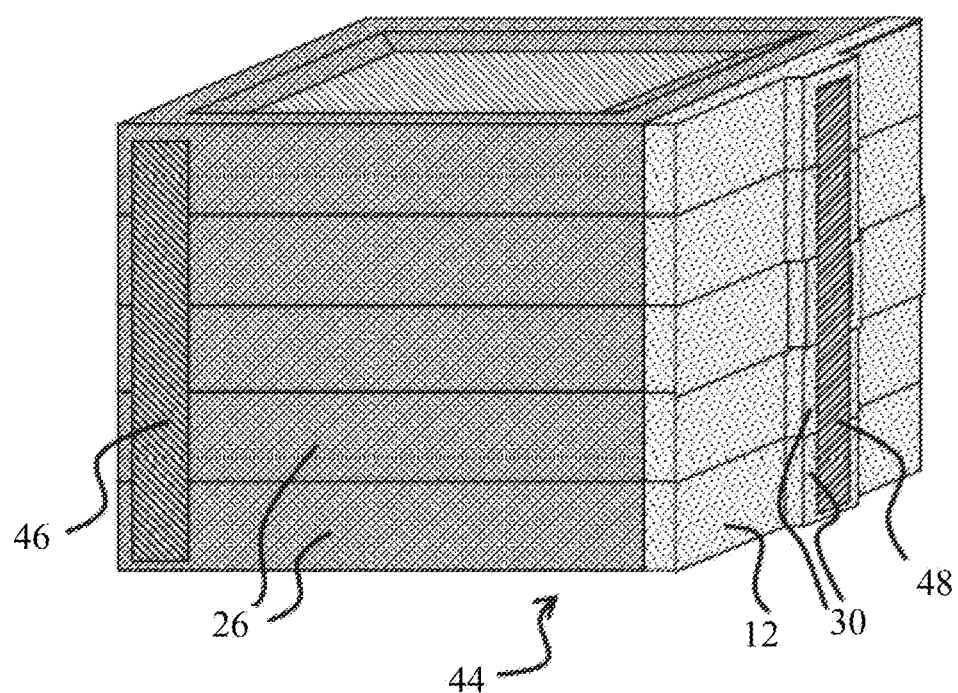
FIG. 6 is a top perspective view of the cell stack of FIG. 4 having the cathodes of the individual cell interconnected to each other by a conductive strip and the anodes interconnected to each other by a conductive strip.
Figure 7:
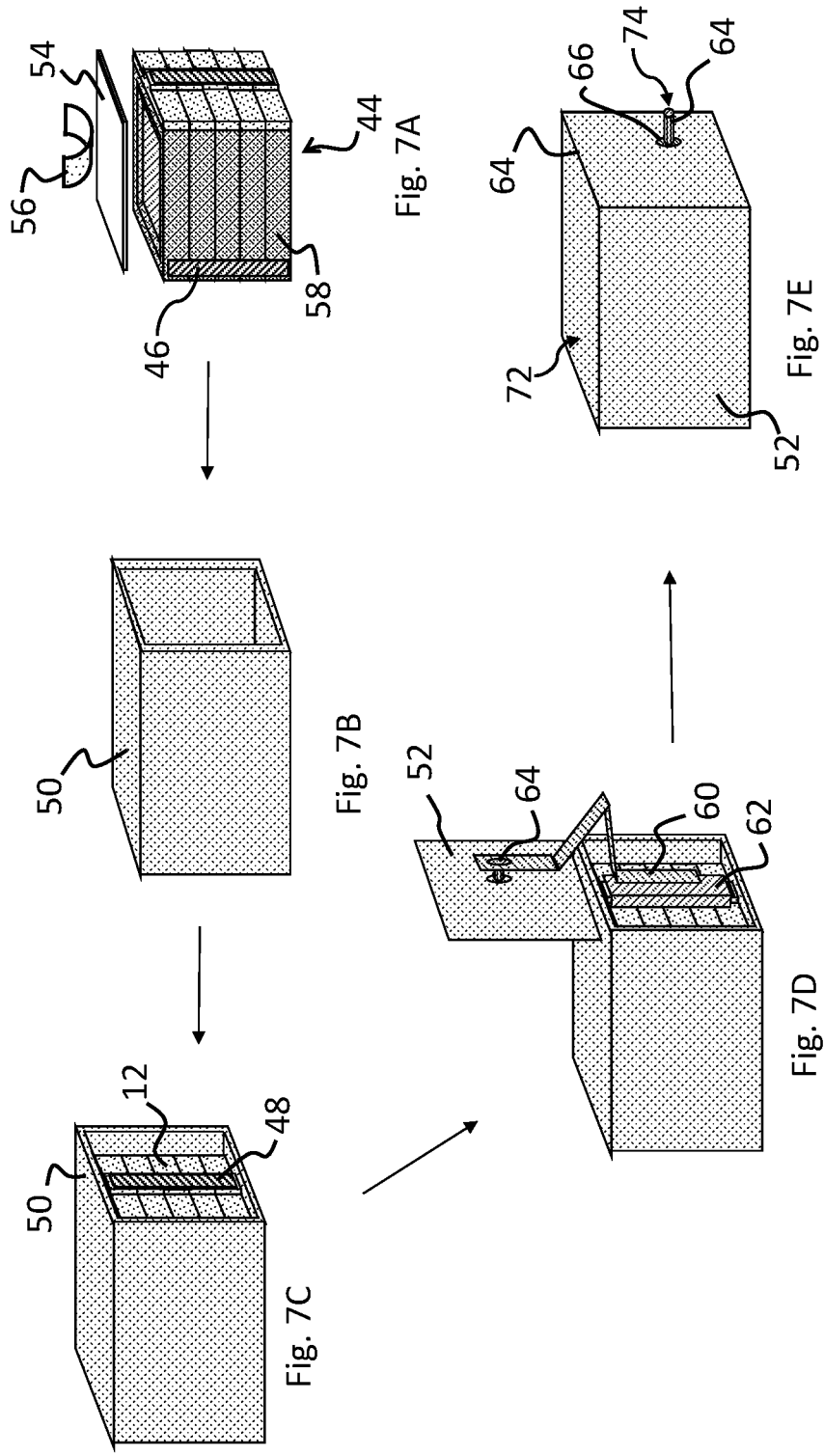
FIGS. 7A, 7B, 7C, 7D, and 7E shows placement of the battery of FIG. 5 into a casing with connection to a common cathode terminal having a glass feed through of the casing and connection of the anodes to the casing with the casing functioning as the anode terminal in accordance with the teachings of the present invention.

Embodiments of the present invention are described herein. The disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, at least some specific structural and functional details disclosed herein are not to be interpreted as limiting, but merely as a basis for the claims and as a representative basis for teaching one skilled in the art to variously employ the present invention.

As an overview, the invention teaches an approach for a dimensionally stable battery package that accommodates the use of anodes that undergo significant volume changes as lithium is cycled in and out of the anode with charge/discharge cycling. Each cell is initially formed as a cathode comprised of active cathode material coated onto a current collector. The cathode is provided with a dimensionally stable picture frame like structure around its perimeter. The frame structure is comprised of electrical insulative material or at least has a non-conductive surface. It is mounted to the cell around the cell's perimeter which is intended to be inactive i.e. no lithium cycling. The insulation frame may be multilayered. The frame creates a recessed well in the region enclosed by its circumference. Electrolyte separator and anode coatings are located within the area enclosed by the frame and thus define the active area of the cell. The thickness of the frame determines the overall cell thickness. The recess well area surrounded by the frame provides a volume within which a lithium based or other anode can expand and contract with cycling of the cell without affecting the overall cell thickness established by the frame.

The cell is fitted with a current collector coating which covers the active area of the cell and extends over the frame of insulation material such that when multiple cells are placed in a stack, electrical access to the current collectors is provided at the edge of the cells. The configuration is such that access is provided to the cathode at a cell edge or section of an edge not covered by anode current collector. The insulation frame is penetrated along an edge or location not covered by anode current collector to provide access to the cathode current collector. Electrical connections can be made at the edges of stacked cells to electrically connect cathode current collectors and anode current collectors to each other in series or in parallel.

Optionally, the cells may be formed with in a bipolar cell configuration wherein the cathode current collector has a cell symmetrically mounted on both sides. Further, the cells may be formed via a series of die cuts, stampings and pressings, by a series of physical deposition coatings or a combination thereof. The present disclosure describes a combination wherein cathodes are first hot pressed onto current collectors and where the remaining components are applied by physical deposition to achieve a preferred cell structure.

Although the term "battery" technically may more properly define a combination of two or more cells, it has come to be used popularly to refer to a single cell. Thus the term battery by itself is sometimes for convenience of explanation used herein to refer to what is actually a single cell. The teachings herein are directed to battery packages formed from cells wherein anode material is isolated in the battery package for a cell.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the needle safety shield, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first cell could be termed a second cell, and, similarly, a second cell could be termed a cell tube, without departing from the scope of the present invention.

The following description is directed towards various embodiments of a reinforced battery package with sealed anode chamber in accordance with the present invention.

Referring to the drawings in detail, where like numerals indicate like elements throughout, there is shown in FIGS. 1-3 a first preferred embodiment of the solid state battery cell, generally designated 10, and hereinafter referred to as the "battery cell" 10 in accordance with the present invention.

The battery cell 10 has a frame 12 formed from a non-electrically conductive material which may be a polymer material or an inorganic material such as a metal oxide. The frame 12 has a frame thickness, Tf, which creates a recessed well 14 circumscribed by the frame 12. The recessed well 14 is an active region of the battery cell 10 within which a cell core 16 is disposed. The cell core 16 has a cell-core thickness, Tc and comprises at least one anode 18, at least one cathode 20 and at least one electrolyte 22 between the at least one anode 18 and the at least one cathode 20. Although the frame 12 is preferably mounted on the at least one cathode 20, in some embodiments the frame 12 may be mounted on the at least one anode 18.

The cell core 16 may have a single anode and a single cathode. Alternatively, the cell core 16 may have a bipolar configuration wherein a common cathode structure is used in combination with two separate anodes, one on each side. A common anode structure could also be used. A bipolar cell based on a common cathode structure is disclosed below for instructive purposes wherein active cathode material is mounted on both sides of a common cathode current collector.

In addition to the cell core 16, the recessed well 14 has at least one cell-core swell accommodating region 24 surrounded by and entirely within the frame 12. The at least one cell-core swell-accommodating recess 24 defines an internal volume into which the cell core 16 is expandable and from which the cell core 16 is contractible. Preferably, the internal volume of the accommodating region 24 is sized to accommodate an increase in the thickness of the at least one anode 18 when the battery cell 10 is in a charged state without changing the overall thickness of the battery cell 10. Accordingly, in preferred embodiments of the battery cell 10, the cell-core thickness (Tc) is less than or equal to the frame thickness (Tf) during cell-charge and/or cell-discharge cycling.

The minimum depth of region 24 is determined by the resulting thickness of the lithium anode when the cell is fully charged. This depth is determined by the amount of lithium active material incorporated in the cathode. An example active material may be a form of Lithium Nickel Cobalt Manganese dioxide (NCM) which has a volumetric cycleable lithium capacity of 100 $\mu Ah/cm^2 \cdot \mu m$. Assume a composite cathode structure that includes a binder material, an electron conductive material, a lithium ion conductive material and the NCM active material wherein the NCM active material represents 40% of the overall cathode volume. If the cathode thickness is 50 $\mu m$, then the equivalent active material thickness will be 20 um, (0.4*50 $\mu m$), and the net capacity will be 2 $mAh/cm^2$, (100 $\mu Ah/cm^2 \cdot \mu m$*20 $\mu m$). Given the capacity of dense lithium metal of 200 $\mu Ah/cm^2 \cdot \mu m$, the depth required for region 24 would be 10 $\mu m$, (2$mAh/cm^2$/200 $\mu Ah/cm^2 \cdot \mu m$).

A conductive anode-current collector 26 extends over a portion of the non-electrically conductive material forming the frame 12 and also extends partially into the recessed well 14. A portion of the surface of the frame 12, preferably the front side, remains exposed. The conductive anode-current collector 26 is in electrical contact with the at least one anode 18.

A tab 30, formed from the non-electrically conductive material of the frame 12, extends outwardly directly from the exposed surface of the non-electrically conductive material forming the frame 12.

A conductive cathode-current collector 28 extends over and is in electrical contact with a portion of the at least one cathode 18. An accessible cathode-current-collector terminal contact 30, in electrical communication with the cathode-current collector 28 is in the tab 30.

In some embodiments of the battery cell 10, the cell core 14 is a symmetric bipolar pair of cells 34, the conductive cathode-current collector 28 is a shared cathode-current collector, and the at least one cathode 20 is an active cathode material mounted on opposite sides of the shared cathode-current collector, the at least one electrolyte 22 is a solid electrolyte film deposited on the active cathode material and the at least one anode 18 is a lithium based anode film deposited on the solid electrolyte film.

When the cell core 16 has a symmetric bipolar configuration, in a preferred embodiment, the at least one cell-core swell-accommodating region 22 comprises a first internal cell volume 36 and a second internal cell volume 38 on opposite sides of the shared cathode-current collector. One cell of the bipolar pair of cells is expandable into and contractible from the first internal cell volume 36 and the other cell of the bipolar pair of cells is expandable into and contractible from the second internal cell volume 38.

In the symmetric bipolar configuration, the cell core 16 preferably has a conductive anode-current collector deposited on the lithium based anode film and over a portion of the non-electrically conductive material forming the frame 12. A tab 30, formed by the non-electrically conductive material of the frame 12, extends outwardly from an exposed surface of the non-electrically conductive material forming the frame 12. An accessible cathode-current-collector terminal contact 32, in electrical communication with the cathode-current collector 26, is in the tab 30.

In some embodiments, the solid state battery cell preferably, but not necessarily, has a compliant polymer 40 coating the anode-current collector 26. Some embodiments may also have a barrier 42 to ion conduction and lithium plating applied between the at least one cathode 20 and the frame 12.

Referring to FIGS. 4-7, there is shown a first preferred embodiment of a multi-cell solid state battery, generally designated 70, and hereafter referred to as the "multi-cell battery" 70 in accordance with the present invention.

The multi-cell battery 70 has a plurality of solid state battery cells 10 with one or more of the elements described above. Accordingly, like reference numbers for like elements are used throughout. The solid state battery cells 10 are arranged in a stack 44 such that the tab 30 of each cell 10 of the plurality of solid state battery cells is aligned and the conductive anode-current collector 26 of adjacent cells 10 of the plurality of solid state battery cells are in electrical contact. An electrically conductive anode terminal strip 46 is attached to the anode-current collector 25 of each cell 10 of the plurality of solid state battery cells and an electrically conductive cathode-current-collector terminal strip 48 is attached to the cathode-current-collector terminal contact 32 of each cell 10 of the plurality of solid state battery cells.

The stack 44 of the plurality of solid state battery cells is disposed in a housing 50 having a hermetically sealed lid 52. A spring load distribution plate 54 is on a top of the stack 44. A spring 56 between the housing 50 and the top of the stack 44 biases the stack 44 away from the top of the housing 50, such that the bottom most anode-current collector 58 is in electrical contact with the housing 50. A cathode terminal lead 60 is bonded to the cathode-current-collector terminal strip 48 by an electrically conductive binder 62. The binder 62 may be a conductive epoxy material or equivalent or it may be a metal applied by tack welding, molten spray, evaporation or other method. The cathode terminal lead 60 couples the cell cathodes 20 to a housing feed-through terminal 60 which forms a hermetic seal with the housing 50 using glass feed through 66. The lid 52 is sealed to the housing 50 by welding along a seam 68 such that the cell stack 44 is hermetically sealed within, thus protecting the cells 10 from the external environment. The housing 50 of the multi-cell battery 70 serves as an anode terminal 72 of the multi-cell battery 70 and the cathode terminal lead 60 serves as a cathode terminal 74 of the multi-cell battery 70.

Figure 8:
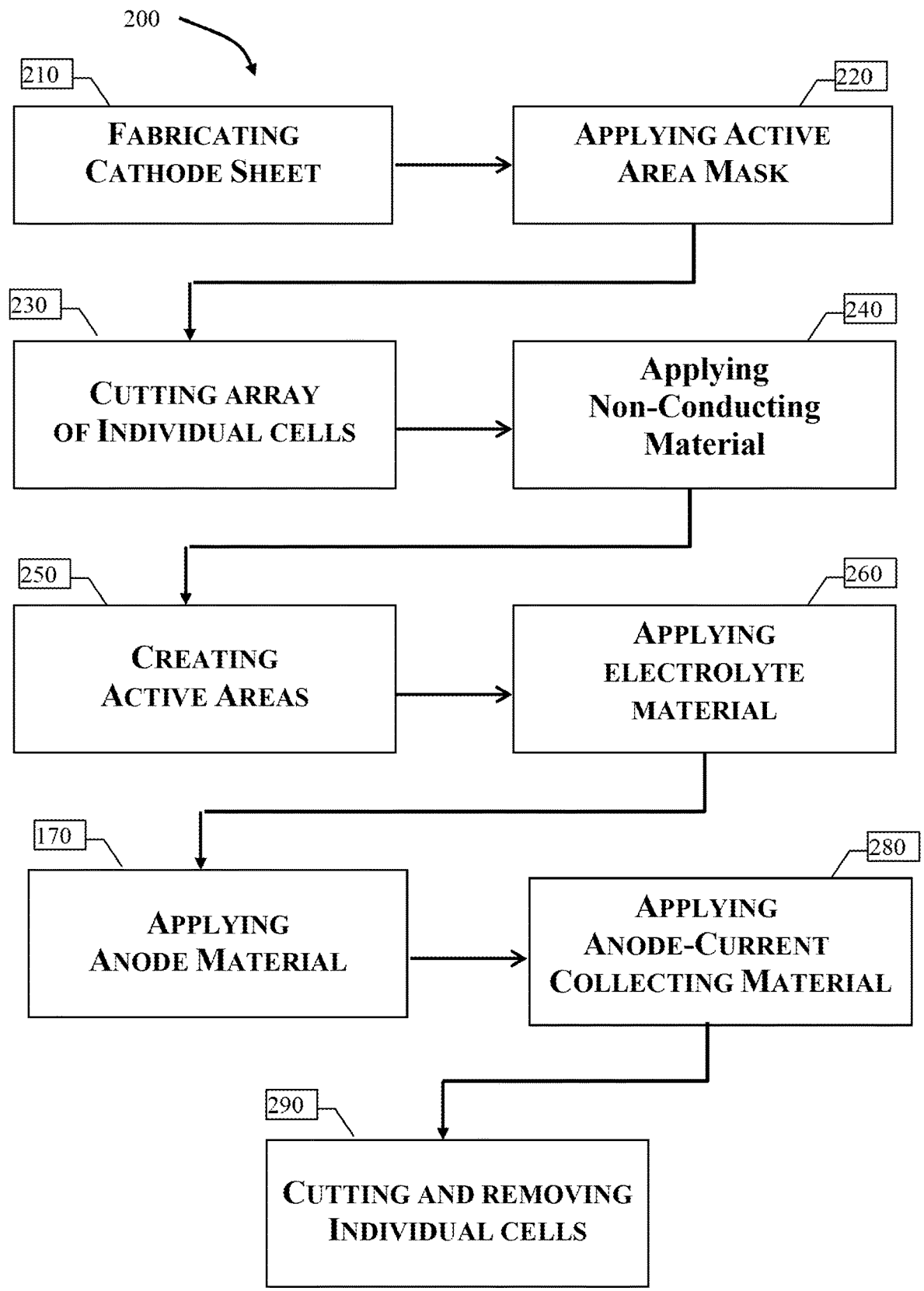
FIG. 8 is a top level functional flow diagram for a preferred embodiment of a method for manufacturing a solid state batter cell in accordance with the teachings of the present invention.

Referring to FIGS. 8-27, the following disclosure is directed to the preferred embodiment of a method for manufacturing the solid state batter cell 10 disclosed above, generally designated 200 and hereafter referred to as the method 200 in accordance with the present invention and to the preferred fabrication materials. FIG. 8 is a top level functional flow diagram of the method 200. Although the following disclosure is directed to cell ore 16 having a single anode and a single cathode, the method 200 is equally applicable for the manufacture of a bipolar cell if the method 200 is applied to both sides of a common cathode current collector.

The first step 210 of the method 200 is fabricating a cathode sheet 76 having a current collector substrate 78 by applying an active cathode material 80 to at least one side of the current collector substrate 78.

Figure 9:
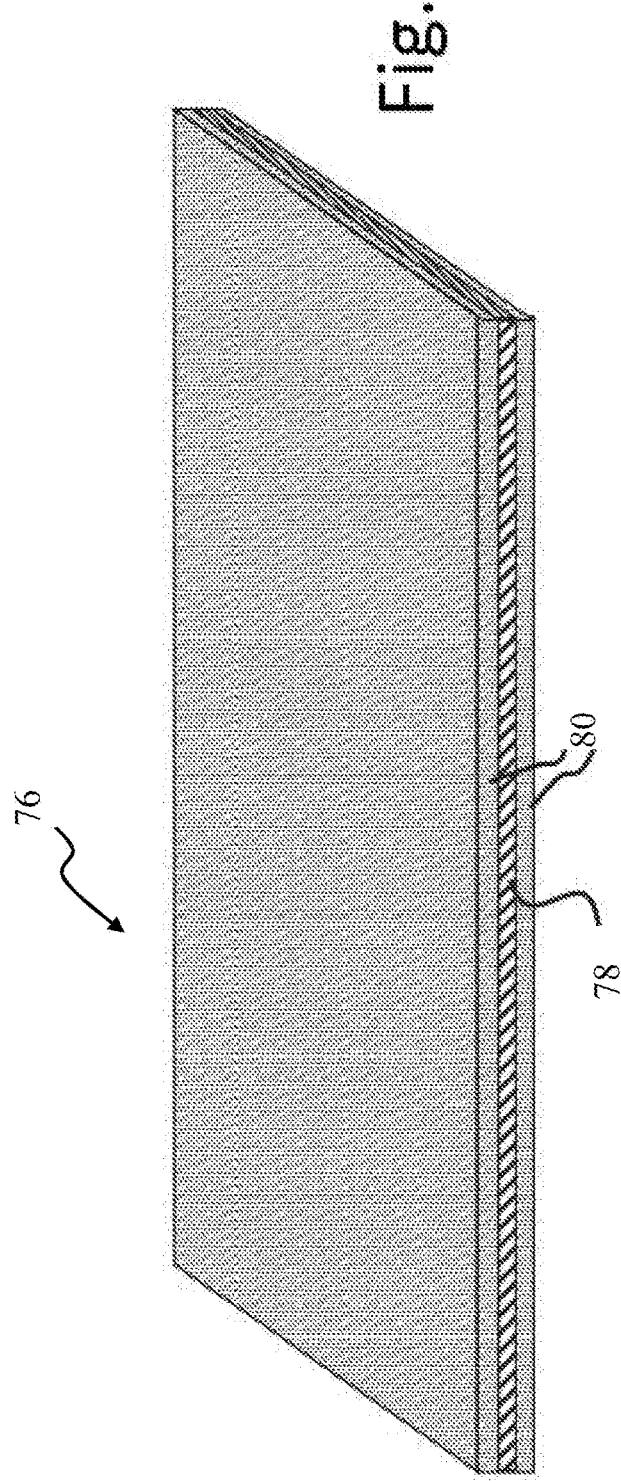
FIG. 9 a top perspective view of a cathode structure consisting of an electronically conductive substrate having active cathode material bonded to both sides.

FIG. 9 shows a sheet of cathode material. It consists of conductive metal current collector substrate 78 which is coated of both sides with active cathode material 80 Current collector 78 is optional depending on the thickness of the cathode material and its structural integrity and electronic conductivity. If used it is preferably aluminum. Cathode material 80 preferably contains at least one lithium active material such as Lithium Manganese Oxide (LiMnO2), Lithium Cobalt Oxide (LiCoO2, LiCO), Lithium Nickel Manganese Cobalt Oxide (LiNi0.33Co0.33Mn0.33O2, NCM), or other suitable lithium reactive material or a combination of reactive materials. The cathode material 80 may also contain additional materials such as carbon or other electronic conductor to promote electron transport and an ion conductor such as LLZO to promote lithium ion transport. The active cathode material coating 80 may be applied by sputter or other physical deposition technique, by slurry casting and drying, sintering or other suitable process.

Figure 10:
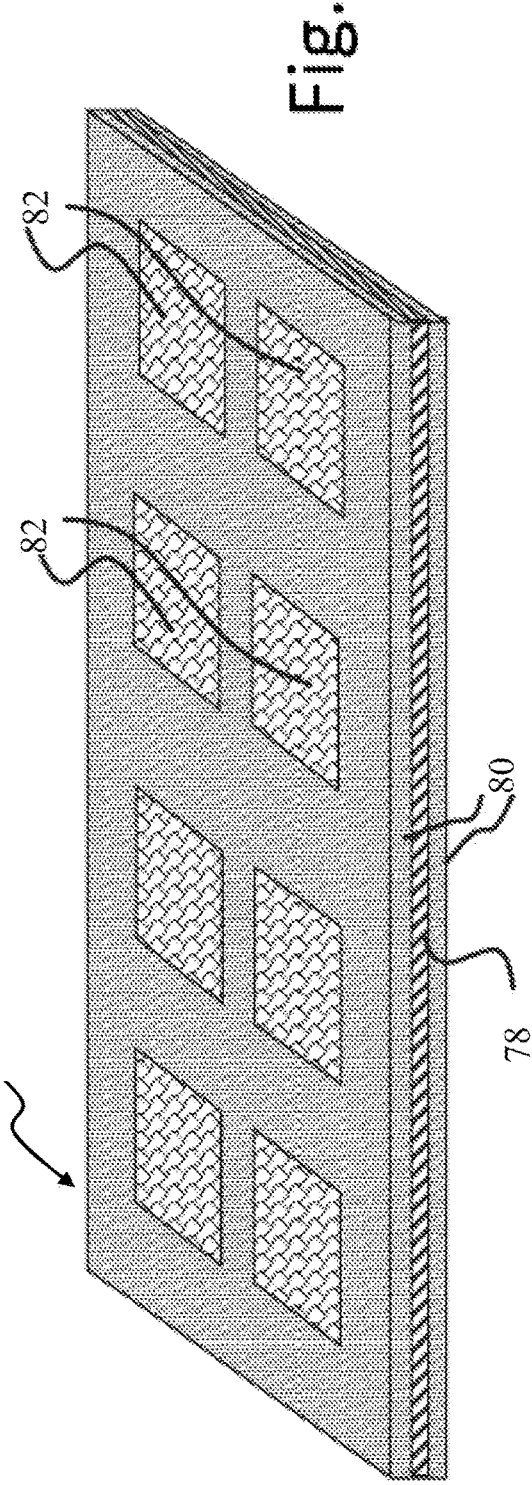
FIG. 10 is a top perspective view of the cathode structure of FIG. 9 having an array of cathode masks applied to its surfaces to define active areas for an array of cells.

The second step 220 of the method 200 is applying an active area mask 82 to the cathode sheet 76 of step 110. FIG. 10 is an illustration of the cathode structure of FIG. 9 having active masks 82 placed in an array on the surface of the active cathode material coating 80 so as to define the locations for the active areas 84 (see, FIG. 14) of individual cells 10 to be formed. For a bipolar cell, masks 82 are placed on both sides of the sheet of cathode material 76 and positioned in pairs that are symmetrically opposite each other.

Figure 11:
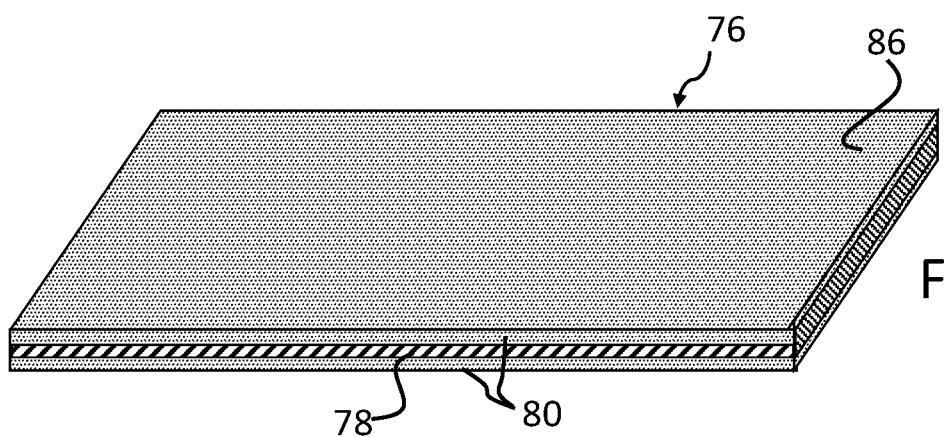
FIG. 11 is a top perspective view of the cathode structure of FIG. 10 having a coating of insulation material applied to both sides and covering the array of cathode masks.

Referring to FIG. 11, in some embodiments, a barrier insulation coating 86 may be applied on both sides the sheet of cathode material 76 after the masks 82 are in place. The barrier insulation coating 86 is applied as a contiguous coating entirely covering the masks 82 of FIG. 10. The barrier insulation coating 86 is preferably an inorganic material such as aluminum oxide, zirconium oxide or other suitable material that blocks ion conduction as well as electronic conduction.

Figure 12:
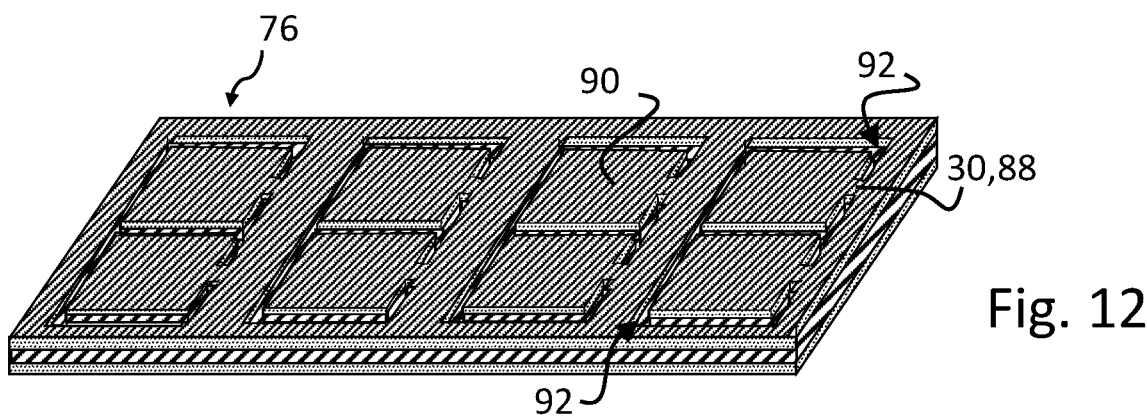
FIG. 12 is a top perspective view of the cathode structure of FIG. 11 having been cut into an array of individual cells.

The third step 230 of the method 200 is cutting in the cathode sheet 76 a pattern yielding an array of individual cells 90 held in place by tabs 88. A cathode-current collector terminal contact 90 is in each tab 88. FIG. 12 shows the cathode structure of FIG. 11 having been cut in the pattern yielding the array of individual cells 90 consistent with the locations of the masks 82 shown in FIG. 10. The illustrated cuts 92 extend all the way through the structure. The required cuts may be created by laser cutting techniques, die cutting/stamping or other suitable approach.

Figure 13:
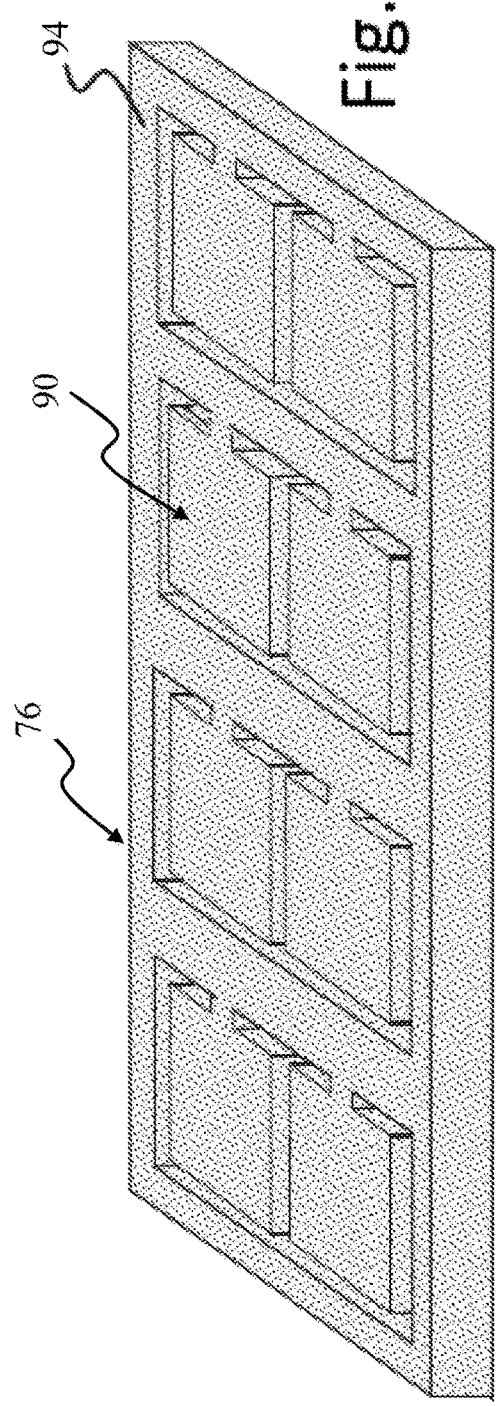
FIG. 13 is a top perspective view of the cathode structure of FIG. 12 with the entire structure having been coated with insulation material.

The fourth step 240 of the method 200 is depositing a non-conducting material 94 on the entire exposed surface of each of the individual cells 90 of the array. FIG. 13 shows the non-conductive material coating 94 covering the entire surface of the cathode sheet 76 after the array of individual cells 90 have been cut. The non-conductive material coating 94 covering extends onto the side surface areas within the cuts such that each individual cell 90 is totally covered.

The fifth step 250 of the method 200 is creating an active area 84 in each individual cell 90 by removing a corresponding area of the non-conducting material 94 to expose the active cathode material 80 of each cell 90 and to form a frame 96 of the non-conducting material 94 circumscribing each active area 84. The frame 96 has a thickness Tf, such that, as each cell 90 is cycled, an overall thickness of the cell does not exceed the thickness of the frame.

Figure 14:
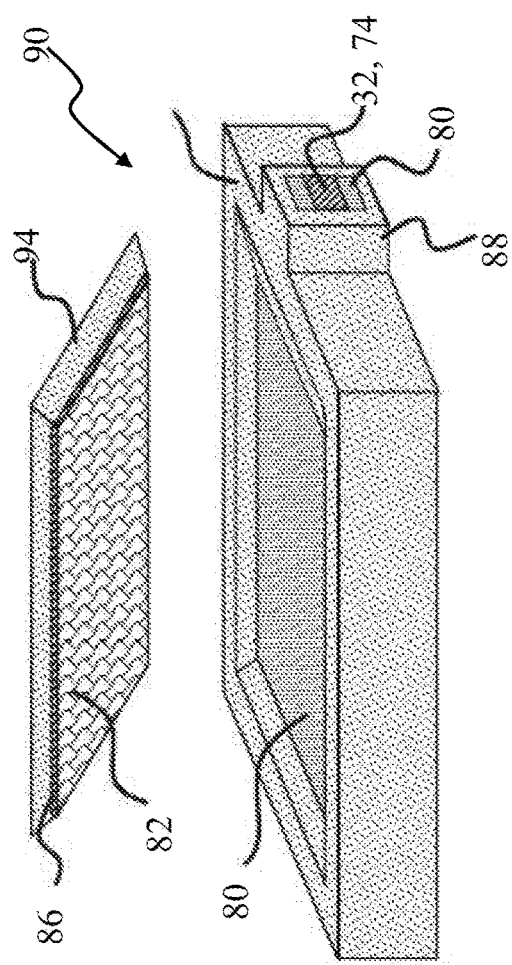
FIG. 14 is a top perspective exploded view an individual cell of FIG. 13 with its mask removed to expose the active surface area of the cathode.

FIG. 14 shows an individual cell 90 of the array with the masks 82 removed. The barrier insulation coating 86 and non-conductive material coating 94 deposited on the masks 82 are removed with the masks 82, exposing the surface of the active cathode material 80. The cut through tab 88 exposes the cathode current collector 32, 74 and cathode material 80 as an edge access point or location. FIG. 15 shows the array of cells 90 of FIG. 13 after masks 82 (see, FIG. 10) have been removed. Each cell 90 in the array has its edges and sides coated with non-conductive material 94. The surfaces of the active cathode material 80 of the individual cells are exposed.

The sixth step 260 of the method 200 is depositing an electrolyte 22, 98 on the active cathode material 82 in the active area 84 of each cell 90. Prior to depositing the electrolyte 22, 98, an electrolyte mask 100 is placed over the surface of the non-conducting material 94 allowing the active cathode material 80 of the cells 90 to remain exposed as shown in FIG. 16.

FIG. 17 shows the active cathode material 80 having been coated with electrolyte material 22, 98. The electrolyte 98 is a solid material such as Lithium Phosphorous Oxynitride (LiPON) or other suitable ion conductor, preferably a lithium ion conductor. Both sides of the cathode sheet 76 may be masked and coated in this way such that the symmetry is maintained in bipolar cells. FIG. 18 shows the cells 90 of the array with the electrolyte masks 100 removed. The illustration shows electrolyte coatings 22, 98 covering the previously exposed active cathode material 82 of each cell 90 in the array with the non-conductive coating material 94 covering the sides and edges of each cell 90.

Figure 19:
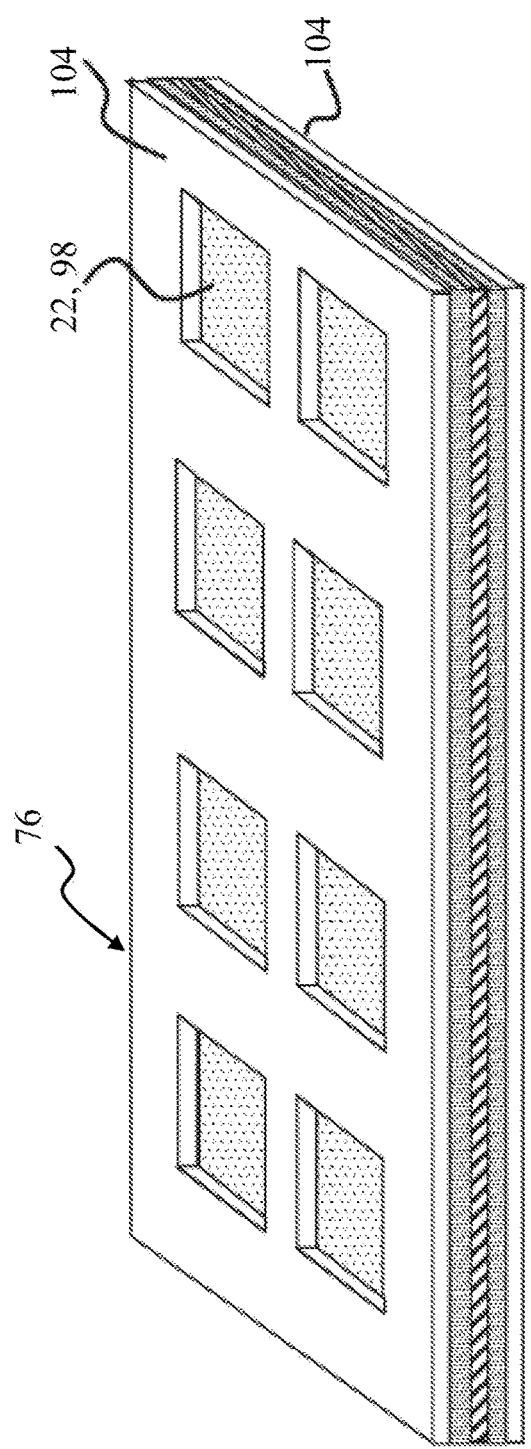
FIG. 19 is a top perspective view of the cell array of FIG. 18 with a mask in place in preparation for a coating of active anode material onto the electrolyte in the active area of the cells.

The seventh step 270 of the method 200 is depositing an anode material on the electrolyte in the active area of each cell. Prior to depositing the anode material 18, 102, an anode mask 104 is placed over the surface of the non-conducting material 94 allowing the electrolyte material 22, 98 of the cells 90 to remain exposed as shown in FIG. 19.

Figure 20:
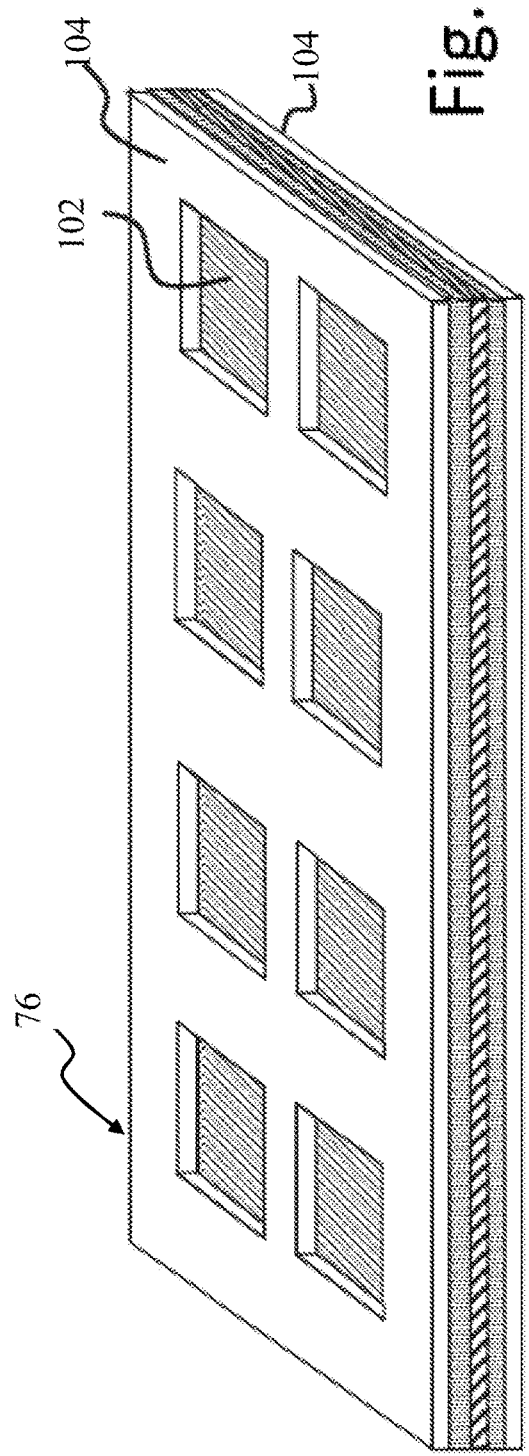
FIG. 20 is a top perspective view of the cell array of FIG. 19 with a coating of active anode material having been applied onto the active surface areas of the cells.

The anode masks 104 are positioned on opposing sides of the cathode sheet 76. The configuration of the masks is such that the areas of the cathode sheet 76 coated by electrolyte coatings 98 are exposed. FIG. 20 shows the structure of FIG. 19 after a lithium active anode material 102 has been applied onto the electrolyte 98 of the individual cells 90. FIG. 21 shows the cathode sheet 76 after the anode masks 104 have been removed. Consistent with prior steps, both sides of the structure are masked and coated with the anode material.

The eighth step 280 of the method 200 is depositing an anode-current collecting material 26, 106 on the electrolyte 22, 98 and on the frame 96 of non-conducting material 94. Prior to depositing the anode collecting material 26, 106, an anode-current collecting mask 108 is placed over the surface of the non-conducting material 94 allowing the anode material 18, 102 of the cells 90 to remain exposed as shown in FIG. 22. FIG. 23 shows the cathode sheet 76 of FIG. 22 after a coating of the anode current collector material 106 has been applied. The anode current collector material 106 is preferably applied by a physical vapor deposition process such as vacuum evaporation, laser deposition or other suitable approach. The anode current collector material coating covers the entire exposed active anode area as well as the exposed sides of each cell. FIG. 24 shows the configuration of the cells 90 of the array after the anode current collector masks 108 have been removed. The areas along the front edges, near tabs 30, 88, of the cells 90 are not coated with anode current collector material. By extending over the sides of the cells 90, the anode current collector coating connects the opposing anodes of each cell to each other in a bipolar cell.

Referring to FIGS. 25-27, in some embodiments, a pliable polymer coating 110 may be applied on both sides the sheet of cathode material 76. FIG. 25 shows a pair of masks 112 placed over the cells 90 of the array in preparation for the application of a pliable polymer coating 110 which is an optional flexible coating that bonds with the anode current collector 106 to improve the ability of the anode current collector 106 to remain intact with repeated expansion and contraction of the anode with cell cycling. The coating is applied to the active areas 3 of the cells, the region where the anode volume changes occur. FIG. 26 shows the cells 90 of the array of FIG. 25 after pliable coating 110 has been applied. The coating 110 may be parylene or other suitable polymer material.

FIG. 27 shows the final structure of the cells 90 of the array after the masks 112 for the pliable coating have been removed. The pliable material 112 covers the center active areas 84 of the cells 90 in the array. Anode current collector material 106 extends under the pliable polymer coating 110 and around the sides of the cells 90 to electrically couple the anodes to each other. The anode current collector 24, 106 does not cover non-conducting material 94 exposed along the edges of the cells 90 or tabs 30, 88.

The ninth step 290 of the method 200 is cutting each tab 30, 88 exposing the cathode-current terminal contact 32 and removing each individual cell 90 from the array. After the tab 30, 88 has been cut, preferably by a laser cutting device, the individual cells 90 can now removed them from the array and have a cell configuration substantially the same as the cell 10 shown in FIGS. 1 and 2.

Figure 28:
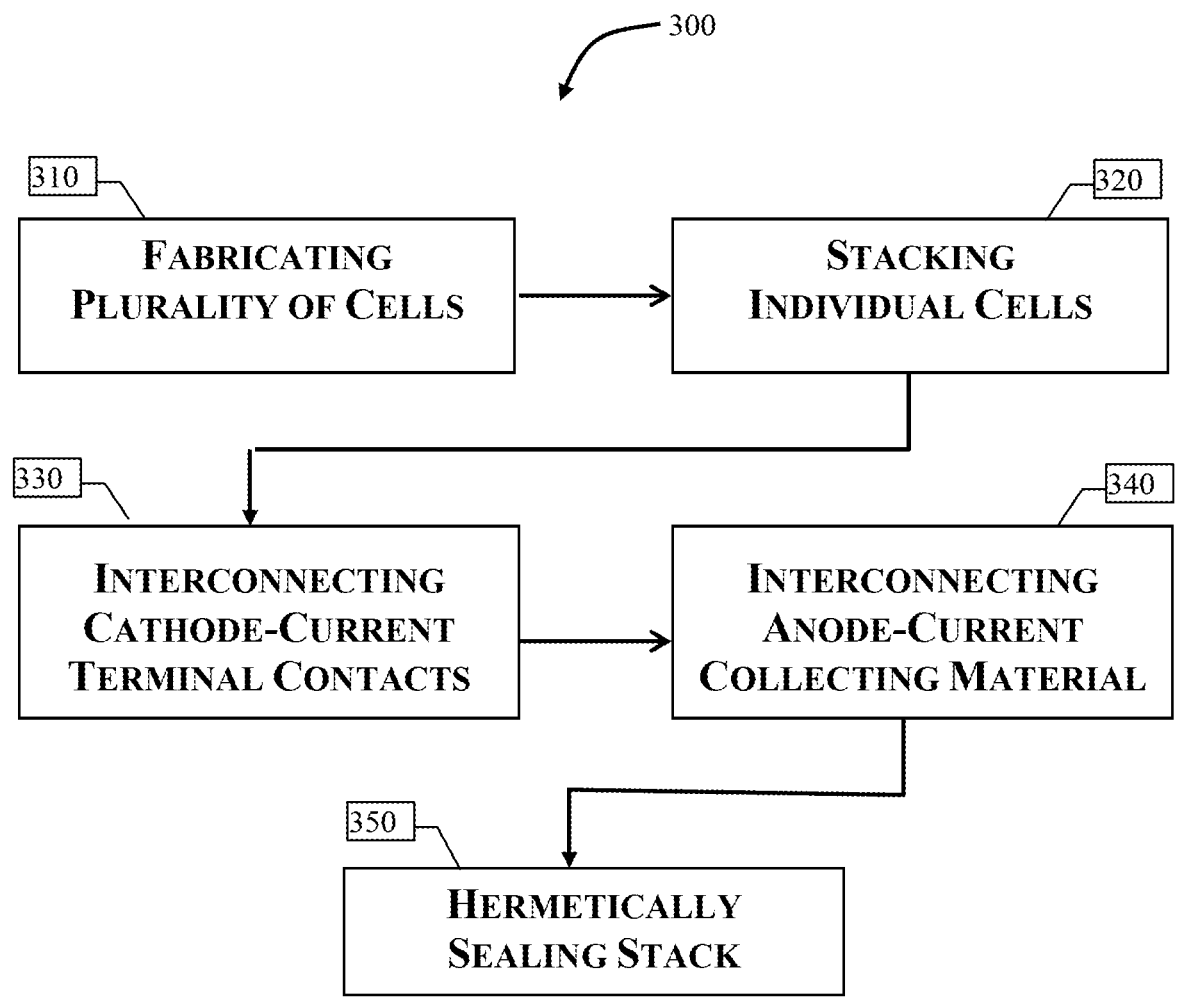
FIG. 28 is a top level functional flow diagram for a preferred embodiment of a method for manufacturing a multi-cell solid state batter in accordance with the teachings of the present invention.

The following disclosure refers to FIG. 28 and is directed to a preferred embodiment of a method for manufacturing a multi-cell solid state battery 70, generally designated 300 and hereafter referred to as the method 300 in accordance with the present invention.

The first step 310 of the method 300 is fabrication of a plurality of cells in accordance with the method 200 disclosed above.

The second step 320 of the method 300 is stacking the individual cells 10, 90 in a stack 44 such that the cathode-current terminal contacts 32 in the tabs 30 are aligned.

The third step 330 of the method 300 is applying a cathode-coating conducting material 48 interconnecting the cathode-current terminal contacts 32.

The fourth step 340 of the method 300 is applying an anode-coating conducting-material 46 interconnecting the anode-current collecting material 106 of each cell 10, 90.

The fifth step 350 of the method 300 is hermetically sealing the stack 44 of in a housing 50 such that the anode-coating conducting-material 106 is in electrical contact with the housing 50 which functions as an anode terminal 72 of the battery and the cathode-coating conducting material 48 is in electrical contact with a cathode lead terminal 60 which is insulated from and extends beyond the housing 50 and functions as the cathode terminal 74 of the battery.

Figure 29:
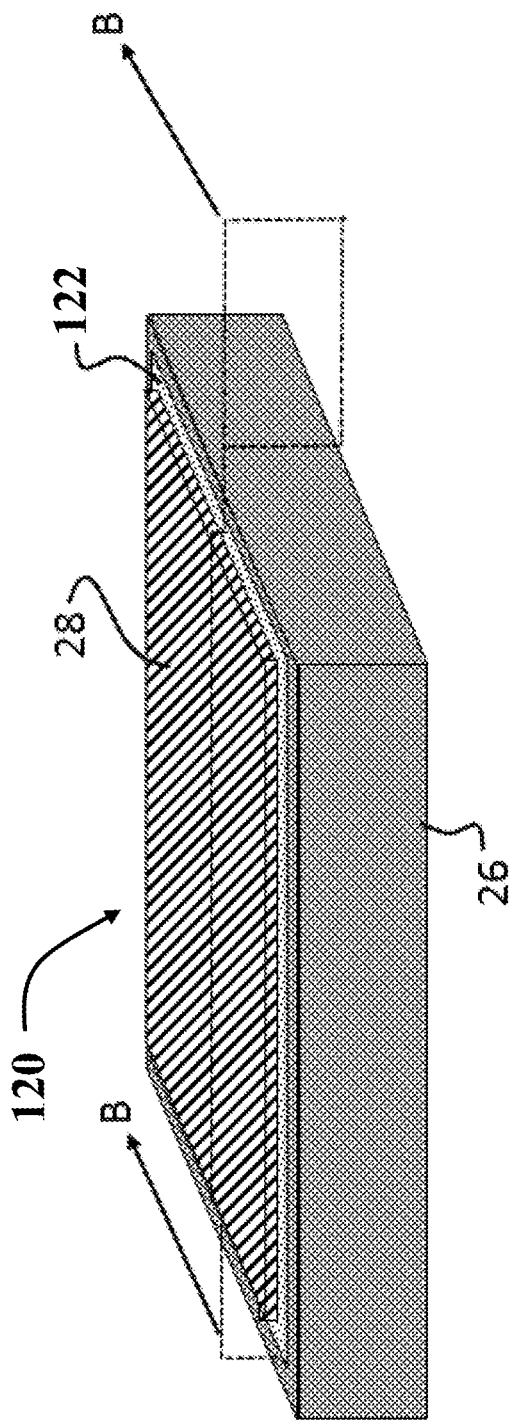
FIG. 29 is a bottom perspective view of an embodiment of a battery cell having an alternate packaging frame defining an inactive perimeter region and a maximum cell thickness in accordance with the teachings of the present invention.
Figure 30:
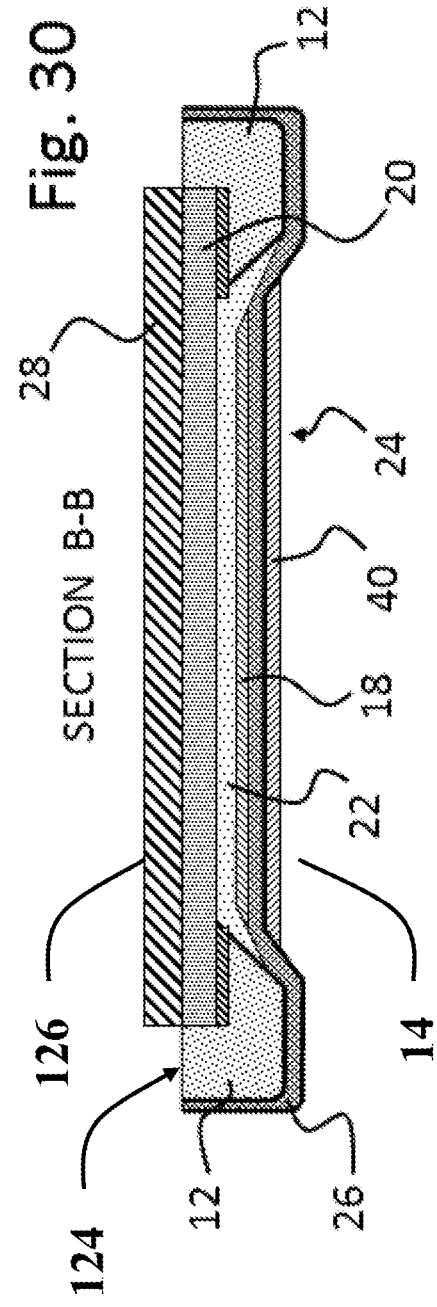
FIG. 30 is a sectional view of the cell of FIG. 29 taken along cross section plane B-B of FIG. 29.

Referring to FIGS. 29 and 30, a preferred embodiment of a single mono-polar battery cell in accordance with the present invention is shown therein and is hereafter referred to as the mono-cell 120. Since the mono-cell 120 comprises many of the same elements as the battery cell 10, like reference numbers for like elements are used throughout. Further, for brevity, the following discussion will be directed only to the features of the mono-cell 120 that are different than the feature of the battery cell 10 and the bipolar pair of cells 34.

The mono-cell 120 has an alternative packaging frame 122 defining an inactive perimeter region 124 circumscribing a recessed well 14 including an accommodating region 24 for anode swelling. As can be seen in FIGS. 29 and 30, the entire outwardly facing surface 126 of the conductive cathode-current collector 28 is exposed. In some embodiments, it may be preferable to eliminate the conductive cathode-current collector 28 allowing the outwardly facing surface of the cathode 20 be serve as the cathode contact of the mono-cell 120.

Figure 31:
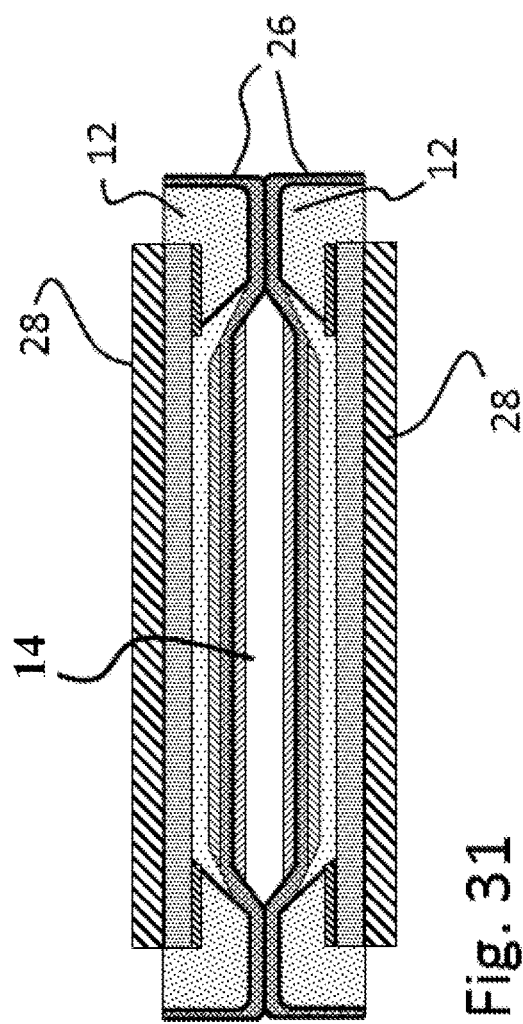
FIG. 31 is a sectional view of a pair of cells representative of FIG. 29 taken along cross section plane B-B of FIG. 29 wherein the cells are configured having a common anode accommodating region.
Figure 32:
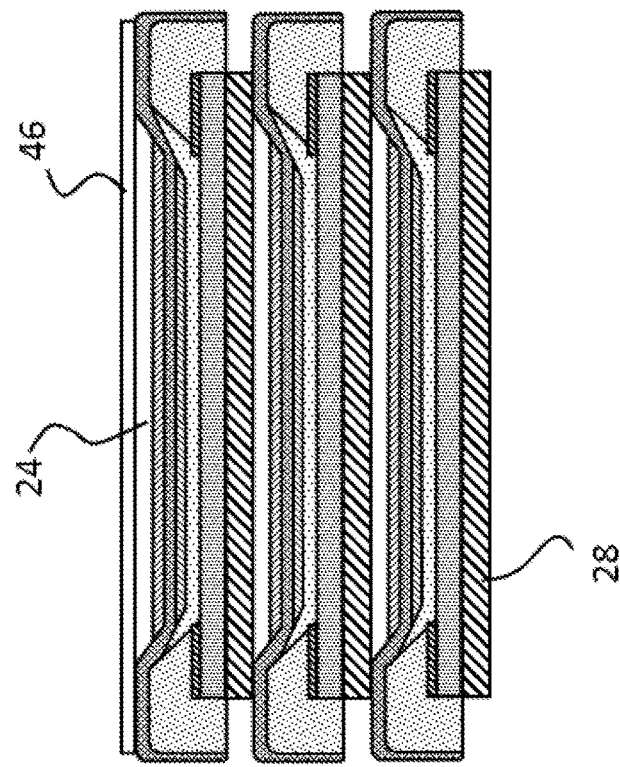
FIG. 32 is a sectional view of a pair of cells representative of FIG. 29 taken along cross section plane B-B of FIG. 29 wherein the cells are configured stacked electrically connected in series with anode and cathode of adjacent cells in contact with each other.

A pair of mono-cells may be stacked as shown in FIG. 31 to form a common anode accommodating region 128. Alternatively, a plurality of mono-cells 120 may be stacked and connected in series as shown in FIG. 32 with the anode and cathode of adjacent cells in contact with each other. In this configuration, the bottom most conductive cathode collector 28 serves as a cathode terminal for the stack and the anode terminal strip 46 serves as the anode terminal for the stack.

The present disclosure describes construction of the invention using physical deposition techniques; however, it is understood that other techniques such as thermal lamination of selected layers may be desirable depending on the physical configuration of the cells. For thicker cells having greater changes in anode volume, lamination using a polymer film or 3D printing the desired frame pattern may be more suitable.

The invention is particularly suitable as a package for a secondary battery, which is also known in the industry as a rechargeable battery. However, the packaging structure and methodology taught herein are applicable to other types of electrochemical cells including primary (or non-rechargeable) cells wherein it is desirable to protect an electrode by isolating it from other substances. Although the invention has been described in the context of isolating anode material, the teachings are equally applicable to the isolation of cathode material. In addition, the reinforced battery package taught provides protection for the electrolyte, anode and cathode cell components.

Many variations and modifications may be made to the above-described embodiments without departing from the scope of the claims. All such modifications, combinations, and variations are included herein by the scope of this disclosure and the following claims. For example, the frame 12 and corresponding cell assembly are shown in rectangular or substantially square embodiments. The invention is not limited to these configurations but teaches any geometric configuration for a squat or low-profile substantially tubular frame structure. For example, suitable shapes include parallelogram, circle, ellipse and various polygons. The invention also encompasses variations in the number of plies of material that comprise the frame structure. The invention teaches that the frame may include plies in addition to the innermost ply and the outermost ply. Such additional plies will provide additional reinforcement and may comprise materials to enhance the performance of either the outermost, electrically conductive ply or the innermost, impermeable, non-electrically conductive ply. The conductive portions of the frames may be die cut and stamped into the desired shape and formed around the cell. The configuration of the of the frame is another example of variations taught by the invention. In an embodiment, the frame is displayed as "squat" or having a "low profile." However, the shape is not limited to a squat, or low-profile, frame of the exemplary embodiment described and, furthermore, the invention contemplates extended as well as lesser elevations. For example, for cells having thicker anodes and/or cathodes, frames having a more extended elevation are employed without departing from the scope of the claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

All references, patent applications, and patents mentioned above are incorporated herein by reference in their entirety and are not to be construed as an admission that any of the cited documents constitutes prior art, or as an admission against interest in any manner.

I claim:

1. A solid state battery cell comprising:
    a dimensionally stable frame formed from a non-electrically conductive material, the frame having a frame thickness;
    a cell-core surrounded by and entirely within the frame and having a cell-core thickness, the cell core comprising at least one anode, at least one cathode and at least one electrolyte between the at least one anode and the at least one cathode, wherein the frame is mounted on the at least one cathode;
    at least one cell-core swell-accommodating recess surrounded by and entirely within the frame, the at least one cell-core swell-accommodating recess defining an internal cell volume into which the cell core is expandable and from which the cell core is contractible, wherein the cell-core thickness is less than or equal to the frame thickness during cell-charge and/or cell-discharge cycling; and
    a hermetically sealed housing within which the solid state battery cell-core is disposed;
    wherein the housing is an anode terminal of the solid state battery cell.

2. The solid state battery cell according to claim 1, further comprising:
    a conductive anode-current collector extending over a portion of the non-electrically conductive material forming the frame, the conductive anode-current collector in electrical contact with the at least one anode; and
    a conductive cathode-current collector extending over and in electrical contact with a portion of the at least one cathode, the conductive cathode-current collector exposed and accessible at a surface of the non-electrically conductive material forming the frame.

3. The solid state battery cell according to claim 2, further comprising:
    a tab extending outwardly directly from an exposed surface of the non-electrically conductive material forming the frame, the tab formed by the non-electrically conductive material of the frame; and
    an accessible cathode-current-collector terminal contact in the tab, the cathode-current-collector terminal contact in electrical communication with the cathode-current collector.

4. The solid state battery cell according to claim 2, wherein:
    the cell core is a symmetric bipolar pair of cells;
    the conductive cathode-current collector is a shared cathode-current collector;
    the at least one cathode is an active cathode material on opposite sides of the shared cathode-current collector;
    the at least one electrolyte is a layer of electrolyte on the active cathode material on opposite sides of the shared cathode-current collector;
    the at least one anode is a layer of lithium based anode material on each layer of the electrolyte material on opposite sides of the shared cathode-current collector; and
    the at least one cell-core swell-accommodating recess comprises a first internal cell volume and a second internal cell volume on opposite sides of the shared cathode-current collector, one cell of the bipolar pair of cells expandable into and contractible from the first internal cell volume and the other cell of the bipolar pair of cells expandable into and contractible from the second internal cell volume.

5. The solid state battery cell according to claim 4, further comprising:
    a tab extending outwardly directly from an exposed surface of the non-electrically conductive material forming the frame, the tab formed by the non-electrically conductive material of the frame; and
    an accessible cathode-current-collector terminal contact in the tab, the cathode-current-collector terminal contact in electrical communication with the cathode-current collector.

6. The solid state battery cell according to claim 4, further comprising a compliant polymer coating the conductive anode-current collector.

7. The solid state battery cell according to claim 4, further comprising a barrier to ion conduction and lithium plating applied between the at least one cathode and the frame.

8. The solid state battery cell according to claim 1, wherein the cell-core has a planar configuration and is positioned within the dimensionally stable frame which extends around its perimeter.

9. The solid state battery cell according to claim 1, wherein the dimensionally stable frame defines an area of the cell that is not active, is protected from electrochemical processes which occur in the cell-core during cycling, and wherein the area of the cell defined by the frame remains chemically and mechanically stable.

10. A multi-cell solid state battery comprising:
a plurality of solid state battery cells according to claim 2 arranged in a stack and connected in series such that the conductive cathode-current collector and the conductive anode-current collector of adjacent cells are in contact with each other.

11. A multi-cell solid state battery comprising:
a plurality of solid state battery cells according to claim 4 arranged in a stack such that the conductive cathode-current collectors accessible at a surface of the non-electrically conductive material forming the frame of each cell of the plurality of solid state battery cells are aligned and the conductive anode-current collector of adjacent cells of solid state battery cells are in electrical contact.

12. The multi-cell solid state battery according to claim 11 further comprising:
an electrically conductive anode terminal strip attached to the conductive anode-current collector of each cell of the plurality of solid state battery cells; and
an electrically conductive cathode-current-collector terminal strip attached to the conductive cathode-current collector of each cell of the plurality of solid state battery cells.

13. The multi-cell solid state battery according to claim 12 further comprising:
a hermetically sealed housing within which the stack of the plurality of solid state battery cells is disposed;
a bottom most anode-current collector in electrical contact with the housing such that the housing is an anode terminal of the multi-cell solid state battery; and
a cathode terminal lead attached to the cathode-current-collector terminal strip, the cathode terminal lead extending beyond the housing such that the cathode terminal lead is a cathode terminal of the multi-cell solid state battery.

14. The multi-cell solid state battery according to claim 13 further comprising:
a spring load distribution plate on a top of the stack;
a spring between the housing and the top of the stack biasing the stack away from the top of the housing.

15. A method for fabricating the solid state battery cell of claim 2 comprising the steps of:
fabricating a cathode sheet having a current collector substrate by applying an active cathode material to one side of the current collector substrate;
applying a non-conducting material on the entire exposed surface of the active cathode material;
creating an active area for the battery cell by removing an area of the non-conducting material to expose the active cathode material and to form a frame of the non-conducting material circumscribing the active area, the frame having a thickness such that as the battery cell is cycled an overall thickness of the battery cell does not exceed the thickness of the frame;
applying an electrolyte on the active cathode material;
applying an anode material on the electrolyte in the active area; and
applying an anode collecting material on the anode and on the frame.

16. A method for fabricating the solid state battery cell of claim 4 comprising the steps of:
fabricating a cathode sheet having a current collector substrate by applying an active cathode material to at least one side of the current collector substrate;
cutting in the cathode sheet a pattern yielding an array of individual cells held in place by tabs, a cathode-current terminal contact in each tab;
applying a non-conducting material on the entire exposed surface of each of the individual cells of the array;
creating an active area in each individual cell by removing a corresponding area of the non-conducting material to expose the active cathode material of each cell and to form a frame of the non-conducting material circumscribing each active area, the frame having a thickness such that as each cell is cycled an overall thickness of the cell does not exceed the thickness of the frame;
applying an electrolyte on the active cathode material in the active area of each cell;
applying an anode material on the electrolyte in the active area of each cell;
applying an anode collecting material on the anode and on the frame; and
removing each individual cell from the array by cutting each tab from each cell, exposing the conductive cathode-current collector.

17. The method for fabricating the solid state battery cell according to claim 16, further comprising applying a barrier to the cathode sheet blocking ion conduction and electronic conduction.

18. The method for fabricating the solid state battery cell according to claim 16, further comprising applying a pliable polymer coating to the array of individual cells.

19. The method for fabricating the solid state battery cell according to claim 16 further comprising:
stacking the individual cells in a stack such that the conductive cathode-current collectors are aligned;
applying a cathode-coating conducting material interconnecting the conductive cathode-current collectors; and
applying an anode-coating conducting-material interconnecting the conductive anode-collecting material of each cell.

20. The method for fabricating the solid state battery cell according to claim 19, further comprising:
hermetically sealing the stack of in a housing such that the housing is an anode terminal of the battery by being in electrical contact with the anode-coating conducting-material and a cathode lead terminal which is insulated from and extends beyond the housing is a cathode terminal of the battery by being in electrical contact with the cathode-coating conducting material.

21. A solid state battery cell comprising:
a dimensionally stable frame formed from a non-electrically conductive material, the frame having a frame thickness;
a cell-core surrounded by and entirely within the frame and having a cell-core thickness, the cell core comprising at least one anode, at least one cathode and at least one electrolyte between the at least one anode and the at least one cathode, wherein the frame is mounted on the at least one cathode;
at least one cell-core swell-accommodating recess surrounded by and entirely within the frame, the at least one cell-core swell-accommodating recess defining an internal cell volume into which the cell core is expandable and from which the cell core is contractible, wherein the cell-core thickness is less than or equal to the frame thickness during cell-charge and/or cell-discharge cycling;

a conductive anode-current collector extending over a portion of the non-electrically conductive material forming the frame, the conductive anode-current collector in electrical contact with the at least one anode;

a conductive cathode-current collector extending over and in electrical contact with a portion of the at least one cathode, the conductive cathode-current collector exposed and accessible at a surface of the non-electrically conductive material forming the frame;

an electrically conductive anode terminal strip attached to the conductive anode-current collector;

an electrically conductive cathode-current-collector terminal strip attached to the conductive cathode-current collector;

a hermetically sealed housing within which the solid state battery cell-core is disposed;

wherein the anode-current collector in electrical contact with the housing such that the housing is an anode terminal of the solid state battery cell; and a cathode terminal lead attached to the cathode-current-collector terminal strip, the cathode terminal lead extending beyond the housing such that the cathode terminal lead is a cathode terminal of the solid state battery cell.

* * * * *